(12) United States Patent
Yao

(10) Patent No.: US 11,293,757 B2
(45) Date of Patent: Apr. 5, 2022

(54) NON-INTERFEROMETRIC OPTICAL GYROSCOPE BASED ON POLARIZATION SENSING AND IMPLEMENTATIONS OF CLOSED LOOP CONTROL ALLOWING FOR SLOW PHASE MODULATION

(71) Applicant: Xiaotian Steve Yao, Las Vegas, NV (US)

(72) Inventor: Xiaotian Steve Yao, Las Vegas, NV (US)

( * ) Notice: Subject to any disclaimer, the term of this patent is extended or adjusted under 35 U.S.C. 154(b) by 0 days.

(21) Appl. No.: 16/383,413

(22) Filed: Apr. 12, 2019

(65) Prior Publication Data

US 2019/0234739 A1    Aug. 1, 2019

Related U.S. Application Data

(63) Continuation of application No. PCT/US2017/056420, filed on Oct. 12, 2017.

(60) Provisional application No. 62/407,446, filed on Oct. 12, 2016.

(51) Int. Cl.
*G01C 19/72* (2006.01)
*G01C 19/04* (2006.01)
*G01C 19/42* (2006.01)
*G02B 6/27* (2006.01)

(52) U.S. Cl.
CPC ........... *G01C 19/721* (2013.01); *G01C 19/04* (2013.01); *G01C 19/42* (2013.01); *G01C 19/72* (2013.01); *G02B 6/2773* (2013.01)

(58) Field of Classification Search
CPC ........ G01C 19/04; G01C 19/42; G01C 19/72; G01C 19/721; G01C 19/722; G01C 19/726
See application file for complete search history.

(56) References Cited

U.S. PATENT DOCUMENTS

| 4,545,682 | A | 10/1985 | Greenwood |
| 5,007,695 | A | 4/1991 | Chang |
| 5,289,259 | A * | 2/1994 | Spammer ............... G01C 19/72 327/3 |
| 6,836,327 | B1 | 12/2004 | Yao |
| 7,265,837 | B1 | 9/2007 | Yao |
| 7,372,568 | B1 | 5/2008 | Yao |
| 7,436,569 | B2 | 10/2008 | Yao et al. |
| 8,773,665 | B1 | 7/2014 | Logan et al. |
| 2007/0121116 | A1* | 5/2007 | Greening ............. G01C 19/726 356/460 |

(Continued)

FOREIGN PATENT DOCUMENTS

| WO | WO-2014110299 A1 * | 7/2014 | ............. G01C 19/72 |
| WO | WO-2014201179 A1 * | 12/2014 | ........... G01C 19/722 |

OTHER PUBLICATIONS

Doerr, C. R., et al., "Orthogonal polarization fiber gyroscope with increased stability and resolution," Applied Options vol. 33, No. 34, 1994.

(Continued)

*Primary Examiner* — Michael A Lyons
(74) *Attorney, Agent, or Firm* — Perkins Coie LLP

(57) ABSTRACT

Techniques and devices for optical sensing of rotation based on measurements and sensing of optical polarization or changes in optical polarization in light waves in an optical loop due to rotation without using optical interferometry and a closed loop feedback in modulating the light in the optical loop.

26 Claims, 27 Drawing Sheets

(56) References Cited

U.S. PATENT DOCUMENTS

| | | | |
|---|---|---|---|
| 2013/0044328 A1 | 2/2013 | Sanders et al. | |
| 2015/0345950 A1* | 12/2015 | Yao | G01J 4/04 356/365 |
| 2015/0369606 A1 | 12/2015 | Sanders et al. | |
| 2016/0202063 A1* | 7/2016 | Yao | G01C 19/721 356/460 |

OTHER PUBLICATIONS

International Search Report and Written Opinion dated Jan. 8, 2018 for International Patent Application No. PCT/US2017/056420 (15 pages).

* cited by examiner

Bulk Interferometric Gyroscope

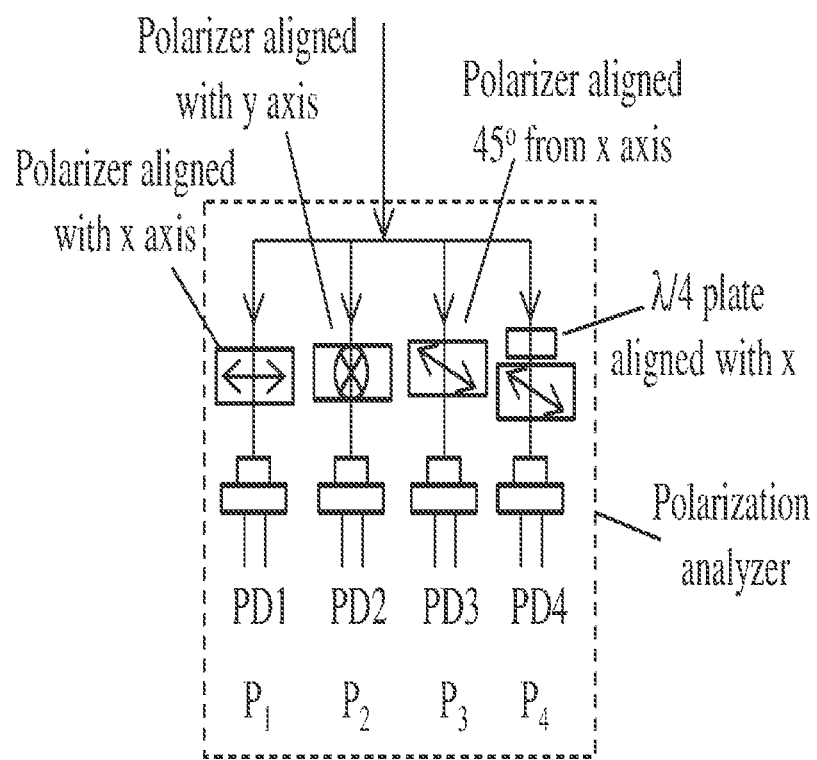
Fig.5 A complete polarization analyzer for obtaining four Stokes parameters.

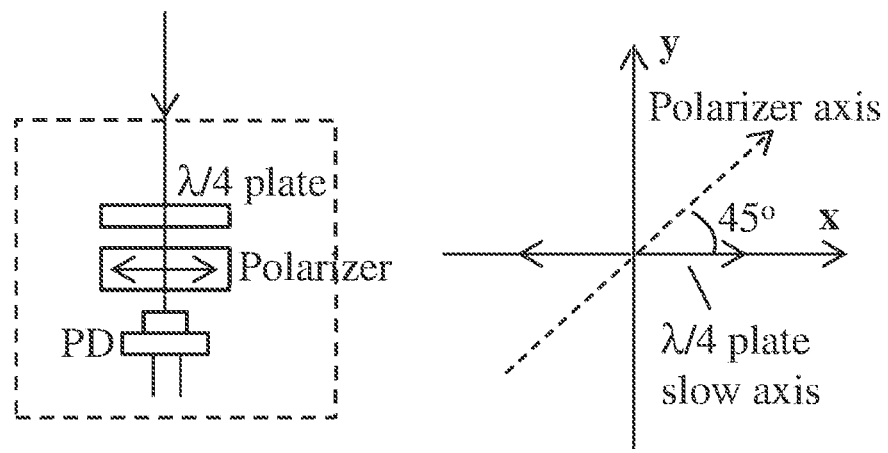
FIG. 10
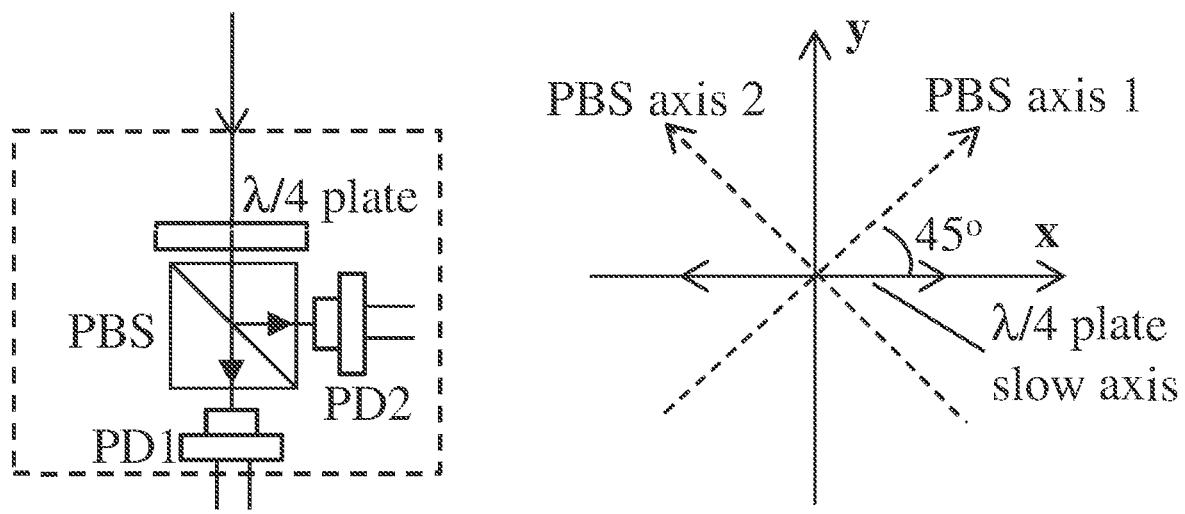
FIG. 11A
FIG. 11B

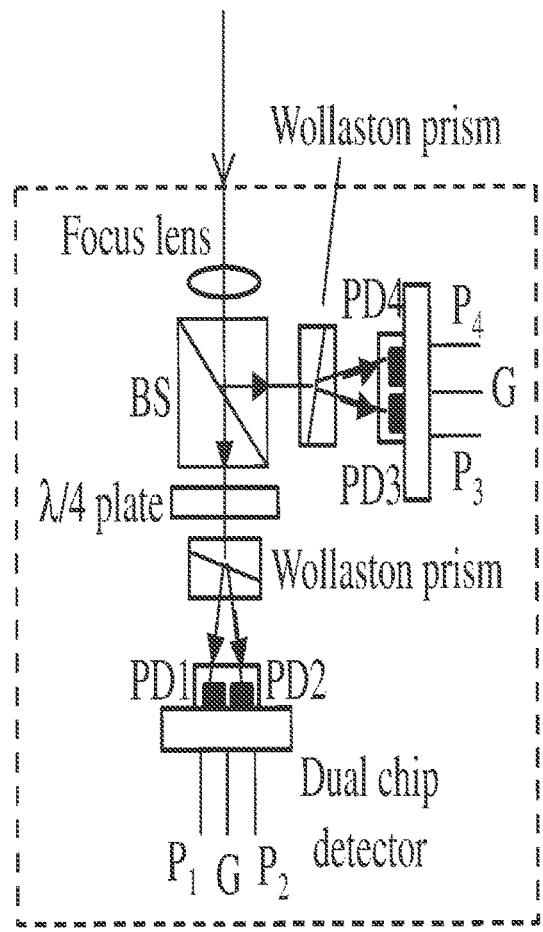 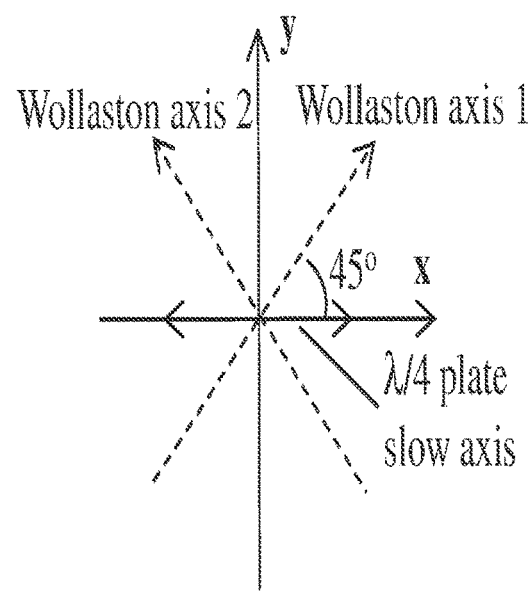
FIG. 15A
FIG. 15B

FIG. 22B

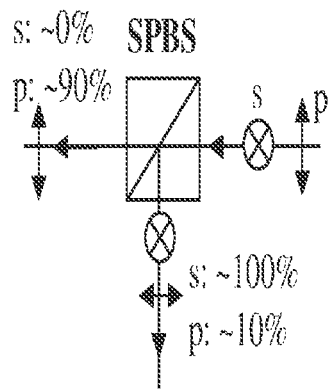

$t_p$: transmissivity of p polarization, $r_p$ and $r_s$: reflectivities of p and s polarizations, respectively.

FIG. 22C

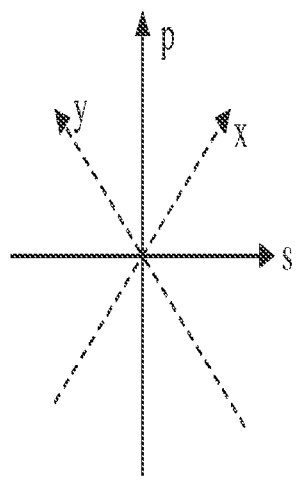

s and p are unit vectors of the s and p polarizations of the special PBS (SPBS). x and y are unit vectors of the axes of Wollaston prisms 1 and 2, which are oriented 45 degrees from s and p. The axes of Wollaston prism 3 are aligned with s and p. The axes of the wave plate are also aligned with s and p.

NON-INTERFEROMETRIC OPTICAL GYROSCOPE BASED ON POLARIZATION SENSING AND IMPLEMENTATIONS OF CLOSED LOOP CONTROL ALLOWING FOR SLOW PHASE MODULATION

CROSS-REFERENCE TO RELATED APPLICATIONS

This application is a continuation of PCT/US2017/056420, entitled "NON-INTERFEROMETRIC OPTICAL GYROSCOPE BASED ON POLARIZATION SENSING AND IMPLEMENTATIONS OF CLOSED LOOP CONTROL," filed on Oct. 12, 2017, which claims priority and benefits of U.S. Provisional Patent Application Ser. No. 62/407,446 entitled "NON-INTERFEROMETRIC OPTICAL GYAROSCOPE BASED ON POLARIZATION SENSING: ADDITIONAL OPTICAL CONFIGURATIONS AND CLOSED LOOP CONTROL," filed on Oct. 12, 2016. The aforementioned applications are incorporated herein by reference in their entirety.

BACKGROUND

This patent document relates to optical devices and optical sensing techniques including optical gyroscopes and optically sensing rotation.

Sensing of rotation can be used in a wide range of applications, including, e.g., navigation, motion sensing, motion control including object stability control, game console controllers, hand-held devices such as smartphones. Optical gyroscopes can be designed to use rotation-induced changes in the optical interference pattern of two counter-propagating optical beams to measure the rotation. Many optical gyroscopes are based on an optical Sagnac interferometer configuration including various interferometric fiber-optic gyroscopes (IFOGs). Such optical gyroscopes can be designed without moving parts and thus eliminate the wear and tear in other gyroscopes with an oscillating proof mass or a moving component. IFOGs are commercialized and in mass production for various military and civilian applications.

FIGS. 1 and 2 show two examples of optical interferometric gyroscopes based on a Sagnac interferometer. FIG. 1 shows a bulk design and FIG. 2 shows a IFOG design based on a fiber loop. To increase the sensitivity and reliability, a relatively long length of fiber coil (e.g., hundreds to thousands meters of fiber) may be used. FIG. 2 further shows an example of a phase modulation mechanism in the IFOG to bias the gyro at a most sensitive point, and a closed loop circuit that is used to increase IFOG's dynamic range and improve its detection sensitivity.

SUMMARY

This patent document disclose optical devices and optical sensing techniques including optical gyroscopes and optically sensing rotation.

In one aspect, a method is provided based on the disclosed technology for sensing rotation based on sensing of optical polarization of light without relying on optical interferometry and includes splitting an input optical beam with an input optical polarization into a first optical beam with a first optical polarization and a second optical beam with a second optical polarization that is orthogonal to the first optical polarization; coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction; combining light of the first and second optical beams at the input/output port, while maintaining the first and second optical beams to be orthogonal to each other without causing optical interference between the first and second optical beams at the input/output port, to produce a combined optical beam as an optical output of the optical loop; detecting the optical output to obtain information on optical polarization of the optical output; and processing the obtained information on optical polarization of the optical output to determine the rotation experienced by the optical loop.

In another aspect, an optical gyroscope is provided based on the disclosed technology for sensing rotation based on sensing of optical polarization of light without relying on optical interferometry. This optical gyroscope includes an optical input/output device that splits an input optical beam with an input optical polarization into a first optical beam with a first optical polarization and a second optical beam with a second optical polarization that is orthogonal to the first optical polarization; and an optical loop coupled to the optical input/output device and having a first loop end to receive the first optical beam to propagate in the optical loop in a first loop direction and a second loop end to receive the second optical beam to propagate in the optical loop in a second loop direction opposite to the first loop direction. The optical input/output device is configured to combine light of the first and second optical beams from the optical loop while maintaining the first and second optical beams to be orthogonal to each other without causing optical interference between the first and second optical beams at the optical input/output device, to produce a combined optical beam as an optical output of the optical loop. This device further includes a detection device that detects the optical output to obtain information on optical polarization of the optical output and processes the obtained information on optical polarization of the optical output to determine the rotation experienced by the optical loop.

In another aspect, an optical gyroscope is provided f based on the disclosed technology or sensing rotation based on sensing of optical polarization of light without relying on optical interferometry. This optical gyroscope includes means for splitting an input optical beam with an input optical polarization into a first optical beam with a first optical polarization and a second optical beam with a second optical polarization that is orthogonal to the first optical polarization; and means for coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction. This optical gyroscope further includes means for combining light of the first and second optical beams at the input/output port, while maintaining the first and second optical beams to be orthogonal to each other without causing optical interference between the first and second optical beams at the input/output port, to produce a combined optical beam as an optical output of the optical loop; means for detecting the optical output to obtain information on optical polarization of the optical output; and means for processing the obtained information on optical polarization of the optical output to determine the rotation experienced by the optical loop.

In another aspect, a method is provided based on the disclosed technology for sensing rotation based on sensing of optical polarization of light without relying on optical interferometry to include directing input light of an input optical polarization into a closed optical loop that is subject to a rotation; coupling the light in the closed optical loop out as an optical output of the closed optical loop; detecting the optical output to obtain information on optical polarization of the optical output without relying on optical interference of light in connection with the closed optical loop; and processing the obtained information on optical polarization of the optical output to determine the rotation experienced by the closed optical loop.

In another aspect, an optical gyroscope is provided based on the disclosed technology for sensing rotation based on sensing of optical polarization of light without relying on optical interferometry and includes a closed optical loop that is subject to a rotation and includes an input/output port to receive input light having an input optical polarization prior to entry of the closed optical loop, the input/output port coupling the light in the closed optical loop out as an optical output of the closed optical loop; a detector unit detecting the optical output to obtain information on optical polarization of the optical output without relying on optical interference of light in connection with the closed optical loop; and a processing unit processing the obtained information on optical polarization of the optical output to determine the rotation experienced by the closed optical loop.

In yet another aspect, an optical gyroscope is provided based on the disclosed technology for sensing rotation based on sensing of optical polarization of light with a feedback control and without relying on optical interferometry. This optical gyroscope can include an optical input/output device that splits an input optical beam with an input optical polarization into a first optical beam with a first optical polarization and a second optical beam with a second optical polarization that is orthogonal to the first optical polarization; and an optical loop coupled to the optical input/output device and having a first loop end to receive the first optical beam to propagate in the optical loop in a first loop direction and a second loop end to receive the second optical beam to propagate in the optical loop in a second loop direction opposite to the first loop direction. The optical input/output device is configured to combine light of the first and second optical beams from the optical loop while maintaining the first and second optical beams to be orthogonal to each other without causing optical interference between the first and second optical beams at the optical input/output device, to produce a combined optical beam as an optical output of the optical loop. This optical gyroscope can also include a detection device that detects the optical output to obtain information on optical polarization of the optical output, which is associated with a phase difference between the counter propagating first and second optical beams in the optical loop, and processes the obtained information on optical polarization of the optical output to determine the rotation experienced by the optical loop; a phase modulator coupled to the optical loop to cause a phase modulation in a least one of the first and second optical beams into the optical loop to produce a modulation induced phase difference between the counter propagating first and second optical beams; and a closed feedback loop control coupled to the detection device and operable to produce a feedback control signal based on the optical output of the optical loop as a feedback to the phase modulator to cause to cause the modulation induced phase difference to balance out a phase difference between the counter propagating first and second optical beams induced by the rotation of the optical loop so that a net phase difference between the counter propagating first and second optical beams in the optical loop is zero or near zero.

In yet another aspect, a method can be implemented based on the disclosed technology for sensing rotation based on sensing of optical polarization of light and a feedback without relying on optical interferometry. This method can include splitting an input optical beam with an input optical polarization into a first optical beam with a first optical polarization and a second optical beam with a second optical polarization that is orthogonal to the first optical polarization; coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction; combining light of the first and second optical beams at the input/output port, while maintaining the first and second optical beams to be orthogonal to each other without causing optical interference between the first and second optical beams at the input/output port, to produce a combined optical beam as an optical output of the optical loop; and detecting the optical output to obtain information on optical polarization of the optical output, which is associated with a phase difference between counter propagating first and second optical beams in the optical loop. In addition, this method can include providing a closed feedback loop control by using information from the optical output of the optical loop as a feedback to produce a feedback control signal; operating a phase modulator as part of the closed feedback loop control to cause a phase modulation in a least one of the first and second optical beams in the optical loop to produce a modulation induced phase difference between the counter propagating first and second optical beams; applying the feedback control signal to the phase modulator to cause the modulation induced phase difference to balance out a phase difference between the counter propagating first and second optical beams induced by the rotation of the optical loop so that a net phase difference between the counter propagating first and second optical beams in the optical loop is zero or near zero; and processing the phase modulation signal applied to the phase modulator to obtain information of the rotation experienced by the optical loop.

Those and other aspects and their implementations, variations and enhancements are described in greater detail in the drawings, the description and the claims.

BRIEF DESCRIPTION OF DRAWINGS

FIG. 3A shows a non-reciprocal configuration: relying on the condition that no differential phase shift between two polarizations at PBS and at reflectors, the polarization rotation of the output light only depends on the gyro rotation. FIG. 3B shows a reciprocal configuration: a 90° Faraday rotator or a half wave plate is used to rotate y into x so that the counter propagating beams experience the same phase from reflectors and PBS.

FIG. 5 shows an example of a complete polarization analyzer for obtaining four Stokes parameters.

FIG. 10 shows an example of an implementation of a polarization analyzer based on. A polarizer is used after the quarter wave plate for polarization analysis. The quarter wave plate's slow (or fast) axis is aligned with the x axis of the PBS in FIG. 7 or the Wollaston prism in FIGS. 8 and 9 to introduce $\pi/2$ phase retardation between the x and y polarization components.

FIGS. 11A and 11B show an example of a second implementation of a polarization analyzer. A PBS is used after the quarter wave plate for polarization analysis. This introduces a nominal phase difference of $\pi/2$ between the two orthogonal polarizations in the light before the PBS. The quarter wave plate's slow (or fast) axis is aligned with the x axis of the PBS in FIG. 7 or the Wollaston prism in FIGS. 8 and 9 to introduce a $\pi/2$ phase retardation.

FIG. 13A shows the device layout and FIG. 13B shows the directions of the two PBS (same orientation) and the quarter wave plate with respect to the PBS or Wollaston prism in FIGS. 7, 8A, 8B and 9. The two PBS' have the same orientation with respect to x and y directions.

FIG. 14B shows an example of directions of axes of the Wollaston prism and the quarter wave plate with respect to the directions x and y of the polarization beam splitter before the fiber coil. This introduces a nominal phase difference of $\pi/2$ between the two orthogonal polarizations in the light before the Wollaston prism.

FIGS. 15A and 15B show an example of a fifth implementation of a polarization analyzer in which two Wollaston prisms are used to replace the two PBS' in FIGS. 11A and 11B and two dual chip photodetectors (PD) are used to replace the four separate PDs. FIG. 15B shows the preferred directions of a Wollaston prism's axis and the quarter wave plate with respect to the directions x and y of the polarization beam splitter before the fiber coil. The two Wollaston prisms have the same orientation with respect to x and y directions.

FIG. 22B shows an example of the special polarization beam splitter (SPBS) in FIG. 22A FIG. 22C shows an example of the polarization orientations of the special polarization beam splitter (SPBS) and the Wollaston prisms 1 and 2 in FIG. 22A, in which the axes of the wave plate and Wollaston prism 3 are aligned with s and p polarization directions of the SPBS, while the axes of Wollaston prisms 1 and 2 are aligned 45 degrees from the s and p polarization directions of SPBS. The focus lens is to focus the light beams onto the detector chips in dual chip detectors 1 and 2. The dual chip PD can be replaced with a dual fiber collimator to couple light into two separate fibers. The outputs of the two fibers are then coupled into two separate PDs.

FIG. 25 is replaced with a LD or SLED chip so that all optical components, including light source, beamsplitter, lenses, Wollaston prisms, dual fiber collimator, and the photodetectors can be integrated into a small package. In this particular example, only the fiber coil and the electronics are outside of the package.

FIGS. 23, 24, 25, and 26 are replaced with a special PBS (SPBS) shown in FIG. 22. The Wollaston prism 3 in FIG. 22 is not necessary in this design and thus can be removed because of the close-loop operation. The dual chip PD can be replaced with a dual fiber collimator to couple light into two separate fibers. The outputs of the two fibers are then coupled into two separate PDs.

DETAILED DESCRIPTION

Figure 1:
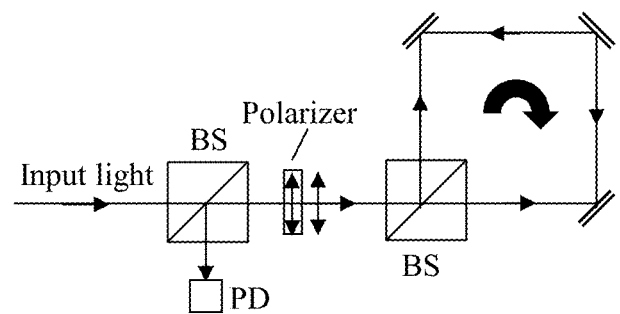
FIG. 1 shows an example of a bulk interferometric optic gyroscope.
Figure 2:
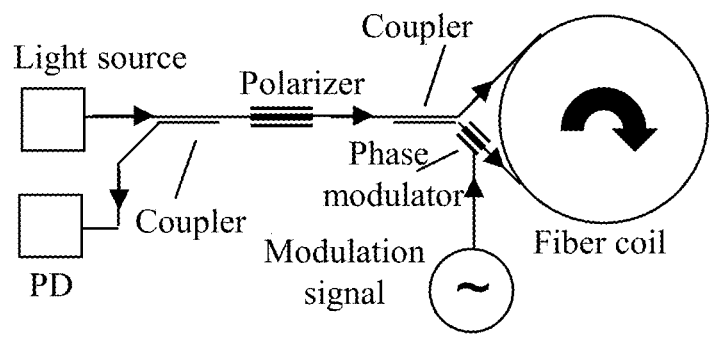
FIG. 2 shows an example of an interferometric fiber optic gyroscope.

This patent document discloses techniques and devices for optical sensing of rotation based on measurements and sensing of optical polarization or changes in optical polarization due to rotation without using optical interferometry. Based on the present optical sensing of rotation from optical polarization, optical gyroscopes can be constructed for a wide range of applications, including but not limited to applications in aircrafts, vessels, and land vehicles and applications in various sensors and devices such as handheld communication devices like tablets and smartphones, game controllers and others for precision rotation rate and angle detection.

In some implementations, a method is provided for sensing rotation based on sensing of optical polarization of light without relying on optical interferometry to direct input light of an input optical polarization into a closed optical loop that is subject to a rotation; couple the light in the closed optical loop out as an optical output of the closed optical loop; detect the optical output to obtain information on optical polarization of the optical output without relying on optical interference of light in connection with the closed optical loop; and process the obtained information on optical polarization of the optical output to determine the rotation experienced by the optical loop. In other implementations, a method is provided for sensing rotation based on sensing of optical polarization of light without relying on optical interferometry. Specifically, this method includes splitting an input optical beam with an input optical polarization into a first optical beam with a first optical polarization and a second optical beam with a second optical polarization that is orthogonal to the first optical polarization; coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction; and combining light of the first and second optical beams at the input/output port, while maintaining the first and second optical beams to be orthogonal to each other without causing optical interference between the first and second optical beams at the input/output port, to produce a combined optical beam as an optical output of the optical loop. In addition, this method includes detecting the optical output to obtain information on optical polarization of the optical output; and processing the obtained information on optical polarization of the optical output to determine the rotation experienced by the optical loop.

Implementations of the present optical sensing of rotation from optical polarization can include optical gyroscopes that detect polarization variations caused by rotation. A closed optical loop can be used to use two counter propagating optical beams to sense the rotation of the closed optical loop—specifically, e.g., measuring a rotation component that has a rotation axis perpendicular to a plane of the closed optical loop.

Figure 3A:
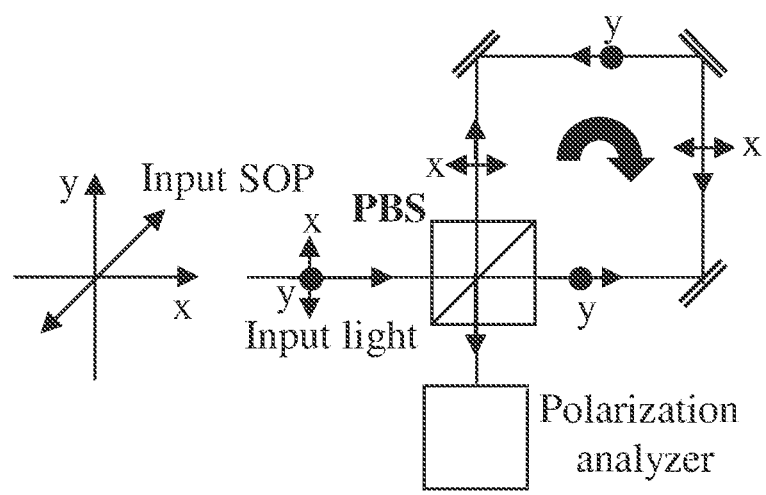
FIGS. 3A and 3B show two examples of optical polarimetric gyroscopes in two different configurations. Input light is polarized 45° from the two polarization axes x and y of the PBS so that two polarization components have the equal power after splitting.
Figure 3B:
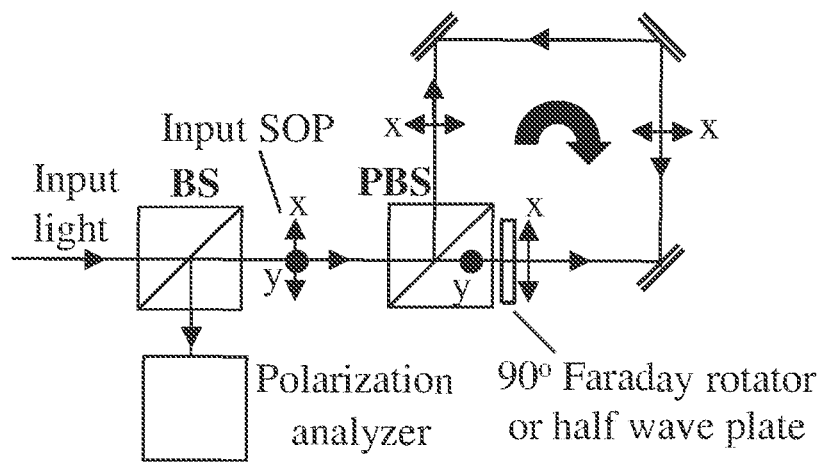
Figure 4A:
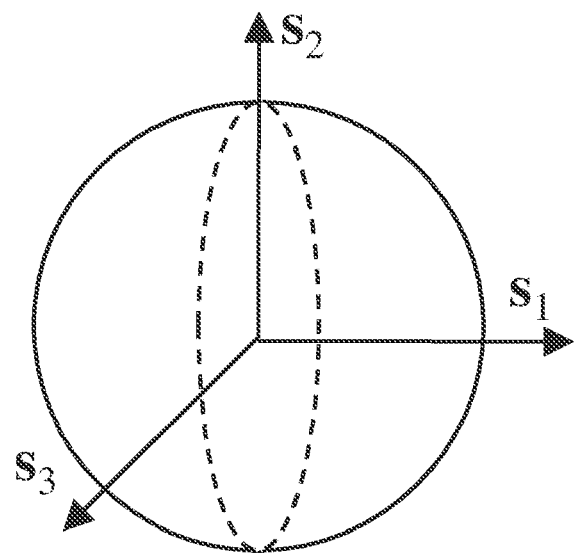
FIG. 4A shows the differential phase shift (DPS) or differential group delay (DGD) induced by the physical rotation causes the output polarization to rotate on a large circle encircling the north and south poles of the Poincare Sphere.
Figure 4B:
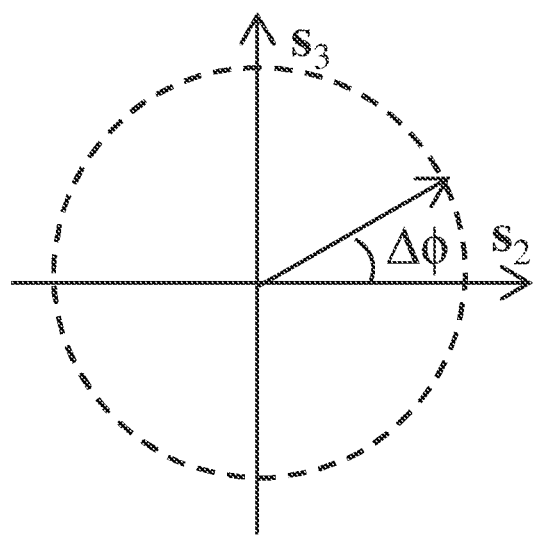
FIG. 4B shows the circular polarization trace in ($s_2$, $s_3$) plane, where Df is the DPS.

FIGS. 3A and 3B show exemplary implementations of optical gyroscopes each having a closed optical loop. An input beam of linear polarization from a light source such as a diode laser or light-emitting diode is split into two orthogonal polarization components by a polarization beam splitter (PBS). The two orthogonal components then travel in opposite directions along a closed optical loop and then recombined at the PBS. Therefore, the PBS in this example operates as an optical input/output port for the closed optical loop. The counter propagating waves experience a relative delay or differential phase when the system is under rotation. Such a relative delay is simply a differential group delay (DGD) between the two orthogonal polarization components. When two components combined at the PBS, the resulting output polarization will rotate along a large circle on enclosing the two poles (Right and left hand circular polarization) as the DGD increased, as shown in FIG. 4A and FIG. 4B. Such a polarization rotation can be measured by a polarization analyzer shown in FIG. 5, as will be described below.

The examples in FIGS. 3A and 3B are different in some aspects and share similar features in other aspects of their optical designs. In both examples, the Input light is polarized 45 o from the two polarization axes x and y of the PBS so that two polarization components have the equal power after splitting. FIG. 3A uses a non-reciprocal configuration: relying on the condition that there is no differential phase shift between two polarizations at PBS and at reflectors, the polarization rotation of the output light only depends on the gyro rotation. Therefore, the design in FIG. 3A uses carefully engineered optical reflectors and PBS to ensure that there is no differential phase shift between two polarization components and thus has less tolerance to variations from specified parameters of the components used in the optical loop. FIG. 3B provides an optically reciprocal configuration: a 90° Faraday rotator or a half wave plate is used to rotate y-polarization into x-polarization so that the counter propagating beams experience the same phase from reflectors and PBS. As such, the design in FIG. 3B is optically reciprocal with respect to both directions of the optical loop and thus can have greater tolerance on imperfections, defects or variations of optical components used in the optical loop.

The electric field of the optical bean before entering the PBS in FIG. 3A or 3B can be written as:

$$\vec{E}_{in} = (E_0/\sqrt{2})(\hat{x}+\hat{y}) \quad (1)$$

where $\hat{x}$ and $\hat{y}$ denote two passing axes or principal axes of the PBS. After the two beams of orthogonal polarizations go around the optical loop and recombined at the PBS, the electric field is then:

$$\vec{E}_{out} = (E_0/\sqrt{2})(\hat{x}+\hat{y}e^{i\Delta\phi}) \quad (2)$$

where $\Delta\phi$ is the phase difference between the counter propagating beams caused by the physical rotation of the optical loop, same as in an interferometric optic gyro, and can be expressed as:

$$\Delta\phi = 2\pi DGD/\lambda_0 = (4\pi A/\lambda_0 c)\omega, \quad (3)$$

where A is the area enclosed by the light beams, $\lambda_0$ is the center wavelength, c is the speed of light, and $\omega$ is the rotation rate. Here we assume that there is no other differential phase shift between the two polarization components when they propagate around the loop. In Eq. (2), we assume that there is no differential phase shift between two polarizations at PBS and at reflectors in FIG. 3A or 3B and that the polarization rotation of the output light only depends on the gyro rotation.

FIG. 4A shows the differential phase shift (DPS) or differential group delay (DGD) induced by the physical rotation causes the output polarization to rotate on a large circle encircling the north and south poles of the Poincare Sphere. FIG. 4B shows the circular polarization trace in (s2, s3) plane, where $\Delta\phi$ is the DPS.

FIG. 5 shows an implementation of a Stokes polarization analyzer for obtaining all the Stokes parameters for the output optical beam from the PBS. The beam is split into four portions spatially. The first one passes through a polarizer aligned with the $\hat{x}$ axis before entering a first photodetector (PD) to obtain a first optical power $P_1$ and the second portion passes through an orthogonal polarizer aligned with the $\hat{y}$ axis before entering a second photodetector to obtain a second power $P_2$. The third portion passes through a polarizer aligned 45° from the $\hat{x}$ axis before entering a third polarizer to obtain a third power $P_3$, and finally the fourth portion passes through a quarter wave plate and a fourth polarizer before entering a fourth photodetector to obtain a fourth power $P_4$. The birefringence axis of the quarter wave plate is aligned the $\hat{x}$ (or $\hat{y}$) axis and the fourth polarizer is aligned 45° from the $\hat{x}$ (or $\hat{y}$) axis. The four Stokes parameters can then be obtained as:

$$S_0 = P_1 + P_2 \quad (4)$$

$$s_1 = (P_1 - P_2)/S_0 \quad (5)$$

$$s_2 = (2P_3 - S_0)/S_0 \quad (6)$$

$$s_3 = (2P_4 - S_0)/S_0 \quad (7)$$

$$P_1 = \alpha|\vec{E}_{out} \cdot \hat{x}|^2 = \alpha E_0^2/2 \quad (8)$$

$$P_2 = \alpha|\vec{E}_{out} \cdot \hat{y}|^2 = \alpha E_0^2/2 \quad (9)$$

$$P_3 = \alpha|\vec{E}_{out} \cdot (\hat{x}+\hat{y})/\sqrt{2}|^2 = (\alpha E_0^2/2)(1+\cos\Delta\phi) \quad (10)$$

$$P_4 = \alpha|\vec{E}_{out} \cdot \tilde{T}_{QWP} \cdot (\hat{x}+\hat{y})/\sqrt{2}|^2 = (\alpha E_0^2/2)(1+\sin\Delta\phi) \quad (11)$$

where $\tilde{T}_{QWP}$ is the matrix representing a quarter wave plate and $\alpha$ is a coefficient including the contributions from optical loss, photodetector quantum efficiency, and electronic gain of each channel. Although the optical losses and detector efficiencies are different from different channels, the electronic gain can always be adjusted to ensure the a coefficient the same for all channels. In Eq. (11), $$\vec{E}_{out} \cdot \tilde{T}_{QWP} = (\hat{x}+\hat{y}e^{i\Delta\phi - i\pi/2}) \quad (12)$$

From Eqs. (5)-(7), the Stokes parameters of the light beam coming back from the loop are:

$$s_1 = 0 \quad (13)$$

$$s_2 = \cos\Delta\phi \quad (14)$$

$$s_3 = \sin\Delta\phi \quad (15)$$

$s_2^2 + s_3^2 = 1$ is just the circle shown in FIG. 4 and $$\Delta\phi = \tan^{-1}(s_3/s_2) \quad (16)$$

$\Delta\phi$ can also be obtained from Eq. (14) or Eq. (15), depending on the its value. For small $\Delta\phi$, Eq. (15) should be used and for large $\Delta\phi$ approaching $\pi/2$, Eq. (14) should be used. Therefore, the polarization rotation angle is simply the differential phase between the two orthogonal polarization components and is linearly proportional to the angular rate of the rotating optic system, and no phase bias is required. By measuring the polarization rotation angle, the system's rotation rate can be obtained.

Because the polarization trace is contained in the $(s_2, s_3)$ plane, there is no need to measure $s_1$ and the measurement of $\Delta\phi$ in FIG. 5 can be simplified, as will be shown below.

Some examples of advantages of this polarimetric configuration include 1) no phase modulators is required to bias the gyro system, resulting significant cost savings; 2) the linear relationship between the polarization rotation angle and the system rotation rate, resulting better scaling factor and large dynamic range; 3) the direction of polarization rotation directly relates to the direction of physical rotation of the gyro system, eliminating the ambiguity associated with the cosine relationship of an IFOG; 4) PBS used in polarimetric optic gyroscope acts both as a beam splitter to obtaining two counter propagating waves and a polarizer to clean up unwanted polarization components when two counter propagation beams return, similar to an IOC in an IFOG; 5) Electronics is simpler and uses less power, because no modulation signal is required to drive the phase modulator and no high speed FPGA/DSP is required for the digital closed loop design. Only low power analog circuit is required for detecting the polarization rotation information.

Figure 6:
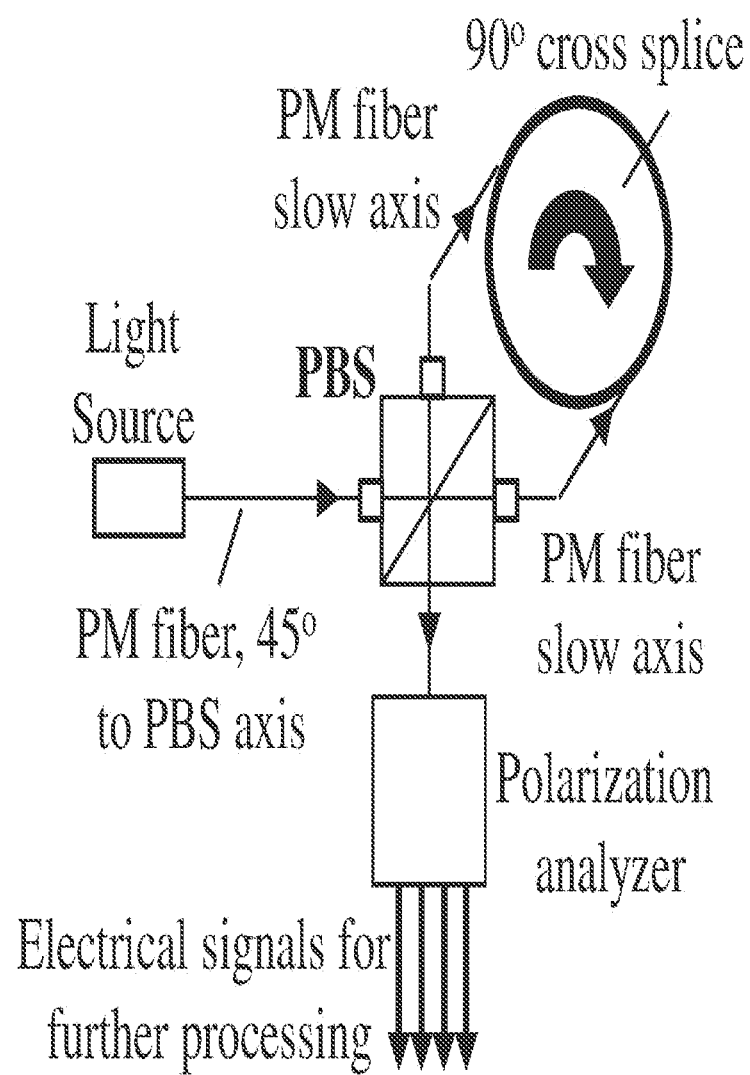
FIG. 6 shows an example of one implementation of a polarimetric fiber optic gyroscope (P-FOG) where a polarization-maintaining (PM) fiber coil is used as a rotation sensing element. To eliminate the detection bias, a 90° cross splice may be used at coil's midpoint.
Figure 7:
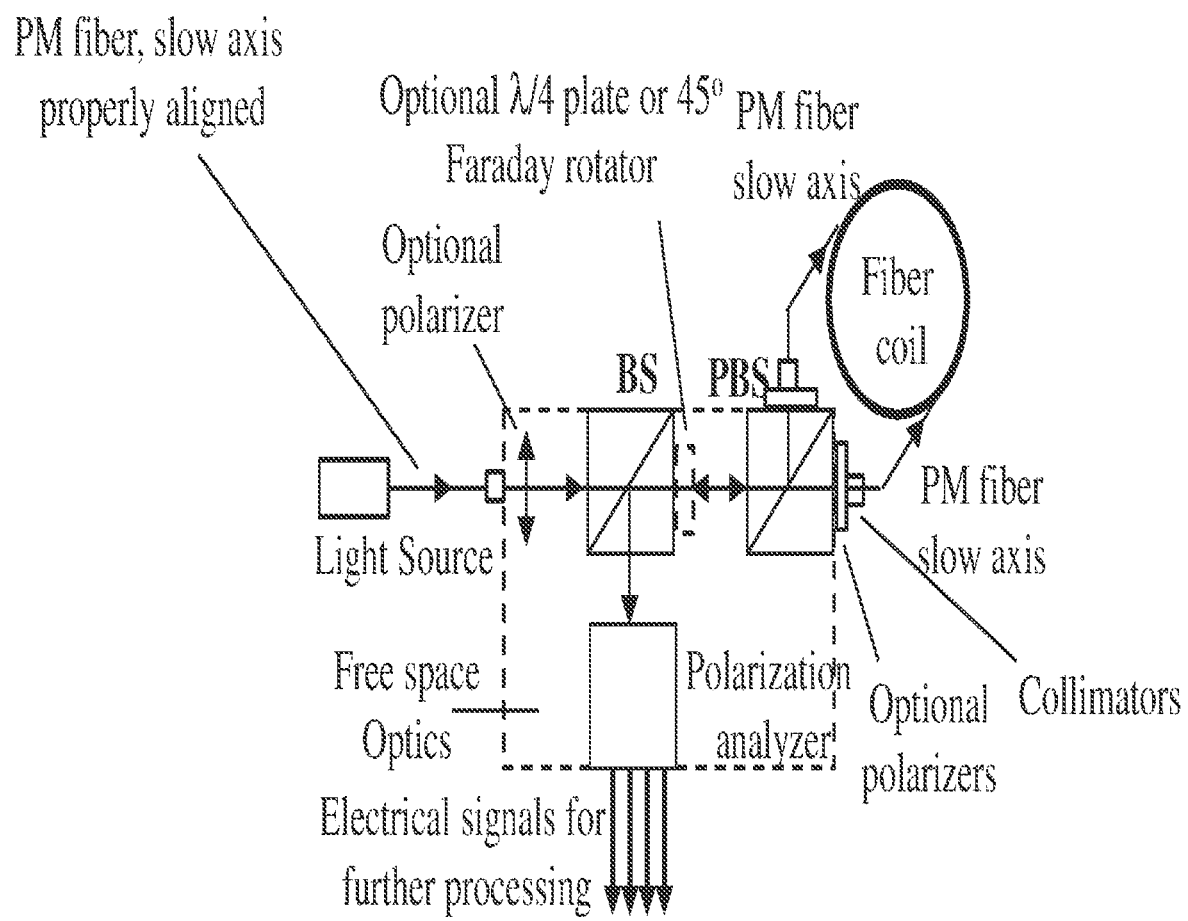
FIG. 7 shows one example of a second implementation of a polarimetric fiber optic gyroscope (P-FOG) where a PM fiber coil is used as a rotation sensing element. A polarization insensitive beam splitter (BS) is used in front of the PBS to direct the returned light from the coil to the polarization analyzer. Two polarizing fiber pigtails can be used to replace the two PM fiber pigtails for better performance.

Optical fiber can also be used in a polarimetric optic gyro to increase the detection sensitivity, as in an IFOG, as shown in FIGS. 6 and 7. Such devices are polarimetric fiber optic gyroscopes, or P-FOGs, to distinguish from its interferometric counterpart, IFOG. Note that in FIG. 6, the two outputs from the PBS can be aligned to the slow and fast axes of the polarization maintaining (PM) fiber respectively, however, a large bias corresponding to the different propagation speeds in the slow and fast axes will result. Such a bias is also sensitive to temperature variations and may result a large detection error. One way to reduce such a bias error is to cross splice the PM fiber at the mid-point of the fiber loop, as shown in FIG. 6. However, such an approach is not practical because it is difficult to find the exact midpoint. The configurations of FIGS. 3A and 6 are inherently not reciprocal and may not be suitable for certain applications that require high accuracy gyros.

FIG. 7 shows an exemplary implementation where both polarization components after the PBS are coupled into the same axis of the PM fiber (slow or fast axis). However, a beam splitter (BS) before the PBS is deployed to direct the beam coming back from the fiber coil into a polarization analyzer. Similar to the minimum configuration in an IFOG [6-7], such a configuration can eliminate all non-reciprocities caused by the optical components. Note that no 90° Faraday rotator or half wave plate is required, as in FIG. 3B, because the PM fiber can be twisted physically to give a 90° rotation.

Note that a single mode (SM), non-PM fiber coil can also be used for the P-FOG configuration disclosed in the application. Similar to an IFOG, PM fiber pigtails connecting to the outputs of the PBS are first used, with their slow (or fast) axis aligned with the direction of polarization of the two output beams. Depolarizers are then spliced to the PM fiber pigtails to depolarize the two output beams before they entering the SM fiber coil [8].

Note again that the two PM fiber pigtails connecting the two outputs of the PBS can also be replaced by two polarizing (PZ) fiber pigtails to further increase the polarization extinction ratio (PER) of the system if the PER of the PBS is not sufficient. In such an embodiment, the polarizations of the two output beams from the PBS are aligned with the passing axis of the PZ fiber pigtail. If a PM fiber coil is used, each end of the PM fiber can be directly spliced to the PZ fiber pigtail, with its slow (or fast) axis aligned with the PZ fiber. If a SM coil is used, a depolarizer is first spliced to one of the PZ fiber pigtails. The output from the depolarizer is then spliced to one end of the SM fiber coil. Alternatively, sheet polarizers, such that made from polarizing glass, can be placed at the output of the PBS to further increase the PER of the PBS.

In FIG. 7, there are three polarization alignment options for the light source: 1) the PM fiber pigtail's slow axis of the light source from left is aligned with one of the s and p axes of the BS and the PBS is physically rotated 45° from the BS to allow ideally equal power splitting for the orthogonally polarized beams at the PBS output ports; 2) the PM fiber pigtail's slow axis of the light source is aligned with one of the s and p axes of the BS and a quarter wave plate or 45° Faraday rotator is used to allow the PBS to split the input light into orthogonally polarized beams with ideally equal power; 3) the PM fiber pigtail's slow axis of the light source is aligned 45° from PBS' polarization axis to allow ideally equal power splitting for the orthogonally polarized beams at the PBS output ports. Optional polarizers can be used at the two outputs to enhance the extinction ratio of the PBS. The reason to align the input polarization from the light source to the s or p axis of the BS is to avoid potential polarization change caused by the imperfection of the BS. An optional polarizer can be placed before the BS to further clean up the polarization from the PM fiber in case the polarization extinction ratio is not sufficient. The polarizer should be aligned to the PM fiber's slow axis (or fast axis).

Figure 8A:
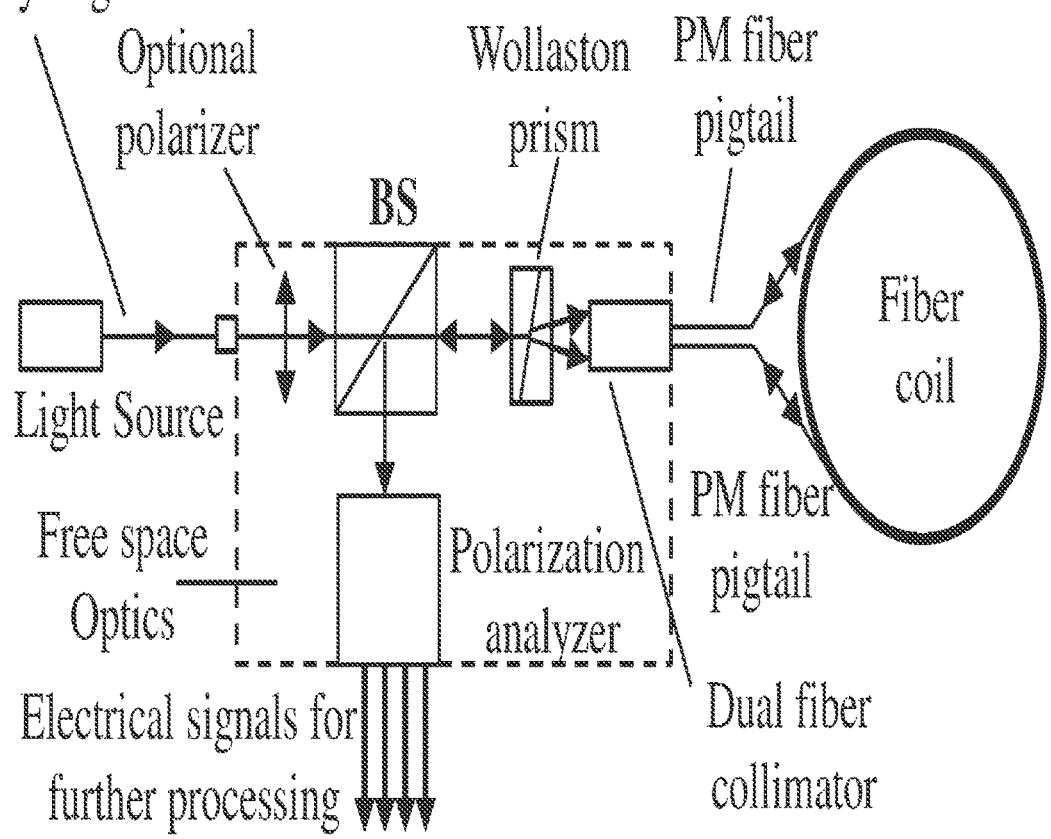
FIG. 8A shows an example of a third implementation of a polarimetric fiber optic gyroscope (P-FOG). A Wollaston prism is used as a polarization beam splitter (PBS) to direct two polarization components into different directions. A dual fiber collimator is used to receive the lights of the two orthogonal polarization components. Two polarizing fiber pigtails can be used to replace the two PM fiber pigtails for better performance.
Figure 8B:
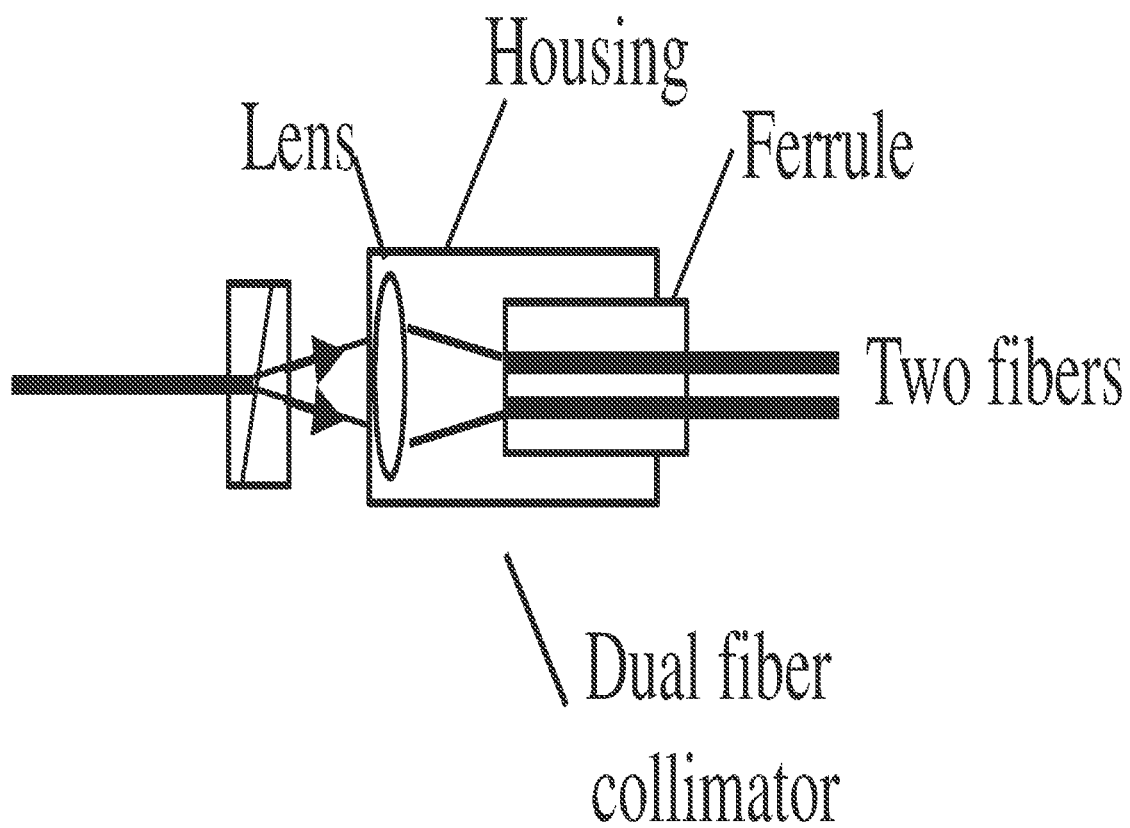
FIG. 8B shows an example of a dual fiber collimator for FIG. 8A which includes a focusing lens to receive the two beams and focus them into two fibers placed at focal plane in close proximity.

FIG. 8A shows a third embodiment where the PBS is a Wollaston prism to direct two orthogonal polarization components into two different directions. One example is that the angle between the two beams is 3.7°. FIG. 8B shows an example of a dual fiber collimator having a focusing lens to receive the two beams and focus them into two fibers placed at focal plane in close proximity. The focusing lens may be a spherical lens, a non-spherical lens, or a graded index lens, and is placed in a housing. A ferrule may be used to hold the two fibers and attached to the same housing. The separation between the two fibers may be 0.25 mm, the diameter of the fiber used. An optional polarizer can be placed before the BS to further clean up the polarization from the PM fiber in case the polarization extinction ratio is not sufficient. The polarizer should be aligned to the PM fiber's slow axis (or fast axis).

In FIGS. 7 and 8, a depolarized light source, such as ASE source, can be used. In this case, single mode (SM) fiber pigtail can be used for the light source. In addition, a polarizer must be used before the BS to polarized the light. The orientation of the polarizer is 45 degrees from the passing axis of the PBS or Wollaston prism to enable equal power splitter.

There are three major advantages to use such a configuration. First, because the Wollaston prism is made of birefringence crystals, high PER is guaranteed; second, the use of dual fiber collimator simplify the design and alignment; and finally, the size of the package can be made smaller. FIG. 8A shows an exemplary implementation in which the light source's PM fiber slow axis is aligned with one of the s and p axes of the BS and the Wollaston prism is properly rotated to allow ideally equal power splitting for the orthogonally polarized beams at the prism's output ports. Each of the polarization components is coupled into the slow (or fast) axis of a PM fiber pigtail. The fiber coil can be made with PM fiber or SM fiber. If SM fiber coil is used, a depolarizer should be used after each of the PM fiber pigtails.

Figure 9:
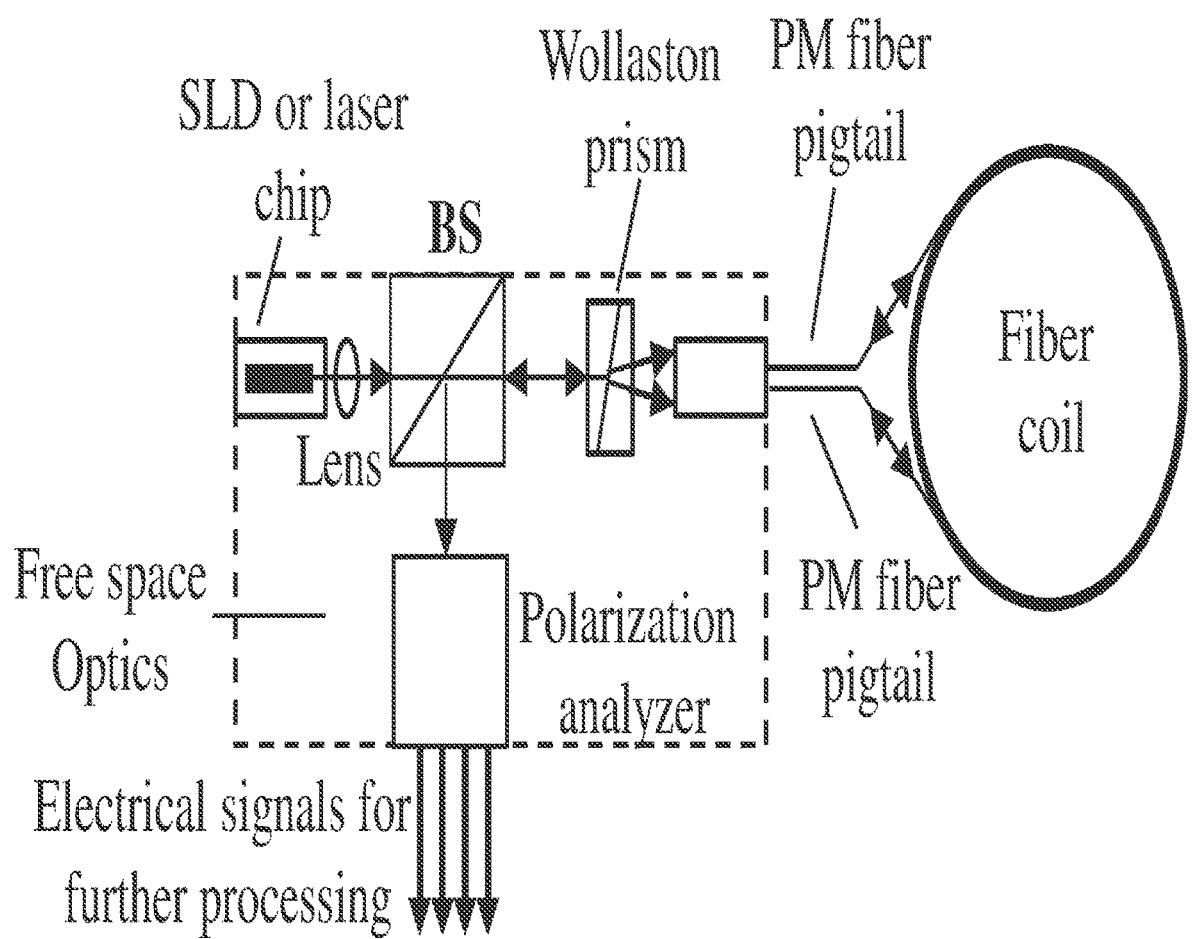
FIG. 9 shows an example of a fourth implementation of a polarimetric fiber optic gyroscope (P-FOG). Two polarizing fiber pigtails can be used to replace the two PM fiber pigtails for better performance.

FIG. 9 shows a fourth embodiment of a P-FOG where a light source, such as a super luminescent light emitting diode (SLD), a LED chip or a semiconductor laser chip, is integrated inside the same package and a Wollaston prism is used as a polarization beam splitter (PBS) to direct two polarization components into different directions. A dual fiber collimator is used to receive the lights of the two orthogonal polarization components.

In some implementations, the output polarization of the SLD can be aligned with one of the s and p axes of the BS and the Wollaston prism is properly rotated to allow ideally equal power splitting for the orthogonally polarized beams at the PBS output ports. The light source can also be included in the dashed box in FIG. 7.

FIG. 10 shows a first embodiment of the polarization analyzer. A polarizer is used after the quarter wave plate for polarization analysis. The quarter wave plate's slow (or fast) axis is aligned with the x axis of the PBS in FIG. 7 or the Wollaston prism in FIGS. 8 and 9 to introduce $\pi/2$ phase retardation between the x and y polarization components. The polarizer's passing axis is oriented 45° from the quarter wave plate's slow axis, as shown in FIG. 10B. A photodetector detects the optical power passing through the polarizer and convert it into an electrical signal. From Eq. (2), the optical power received at the photodetector is the same that in Eq. (11) and the corresponding voltage $V_1$ is:

$$V_1 = G_1(\alpha E_0^2/2)(1+\sin \Delta\phi) = V_{10}(1+\sin \Delta\phi), \quad (17)$$

where $G_1$ is the electrical conversion coefficient of the receiving circuit, $\alpha$ is a loss coefficient from optical components and $V_{10} = G_1(\alpha E_0^2/2)$ is the detector voltage. From Eq. (17), the rotation induced phase can be obtained as:

$$\Delta\phi = \sin^{-1}(1 - V_1/V_{10}) \quad (18)$$

In Eq. (18), $V_{10}$ can be first obtained when setting the rotation rate to zero at the calibration stage of the P-FOG, assuming that the optical power from the light source remains constant. A problem with Eq. (18) is that any power fluctuations will cause $V_1$ to fluctuate and hence induce a measurement error. To overcome this problem, we can use a second embodiment of the polarization analyzer, as shown in FIG. 11. The voltage generated by the first photodetector is still Eq. (17) and the voltage generated by the second photodetector PD2 is $$V_2 = G_2(\alpha E_0^2/2)(1-\sin \Delta\phi) = V_{20}(1-\sin \Delta\phi) \quad (19)$$

One may always adjust the gain $G_2$ of the PD2's amplification circuit such that $V_{10} = V_{20} = V_0$ and take a difference between $V_1$ and $V_2$ to obtain the rotation induced phase:

$$\Delta\phi = \sin^{-1}[(V_1 - V_2)/(V_1 + V_2)] \quad (20)$$

Figure 12A:
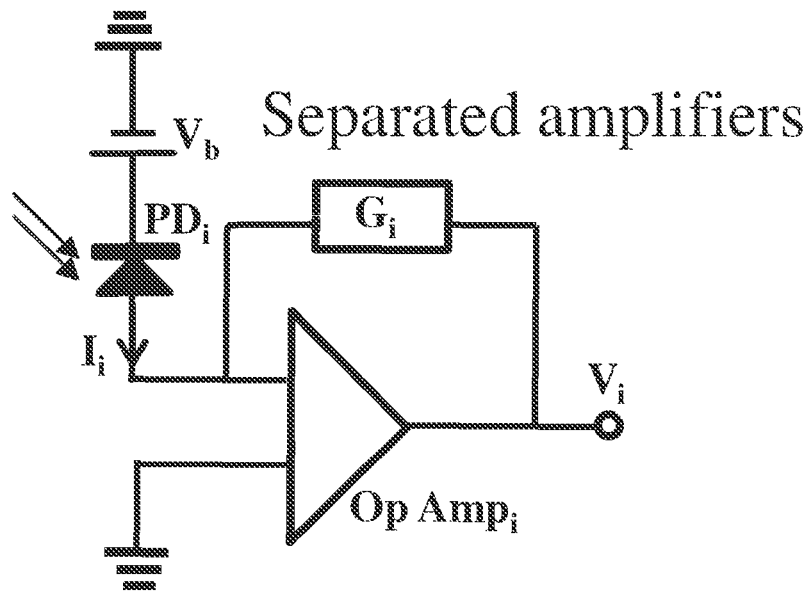
FIGS. 12A and 12B show two examples of detection circuits in two different detector configurations.

Note that in the discussions above, two separate amplifiers are used for each detector, as shown in FIG. 12A. The calculations in Eqs. 17 to 20 can be carried out using either analog circuitry or digital circuitry. When digital circuitries are used, analog-to-digital converters and microprocessors, such as microcontrollers, FPGA, or DSP must be used.

Figure 12B:
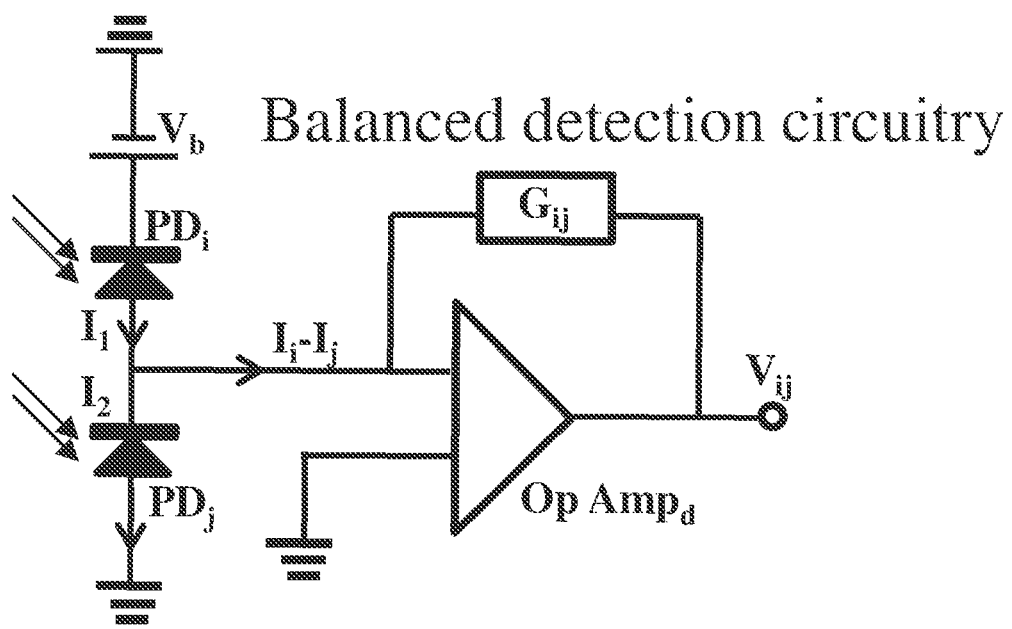

Alternatively, a balanced detection circuitry may be used to amplify a differential photocurrent between PD1 and PD2 as shown in FIG. 12B:

$$V_{12} = G_{12}(I_1 - I_2) = 2G_{12}I_0 \sin \Delta\phi, \quad (21)$$

where $G_{12}$ is the trans-impedance amplifier gain of the balanced detector, $V_{12}$ is the resulting voltage, and $I_1$ and $I_2$ are the photocurrents received in PD1 and PD2 respectively:

$$I_1 = \beta_1(\alpha E_0^2/2)(1+\sin \Delta\phi) = I_{10}(1+\sin \Delta\phi) \quad (22)$$

$$I_2 = \beta_2(\alpha E_0^2/2)(1-\sin \Delta\phi) = I_{20}(1-\sin \Delta\phi) \quad (23)$$

In Eqs. (22) and (23), is proportional to the responsivity of a photodetector and its follow-on circuit. Adjusting the circuit parameters can always make $I_{10} = I_{20} = I_0$. From Eq. (21), the rotation induced phase can be obtained as:

$$\Delta\phi = \sin^{-1}[(I_1 - I_2)/(I_1 + I_2)] = \sin^{-1}[V_{12}/(2G_{12}I_0)] \quad (24)$$

The use of balanced detection circuits can eliminate the power fluctuations and the relative intensity noise of the light source. The calculation of Eq. (24) can be obtained by either an analog circuitry, and digital circuitry, or the combination of both that follow the Op Amp in FIG. 12B.

Figure 13A:
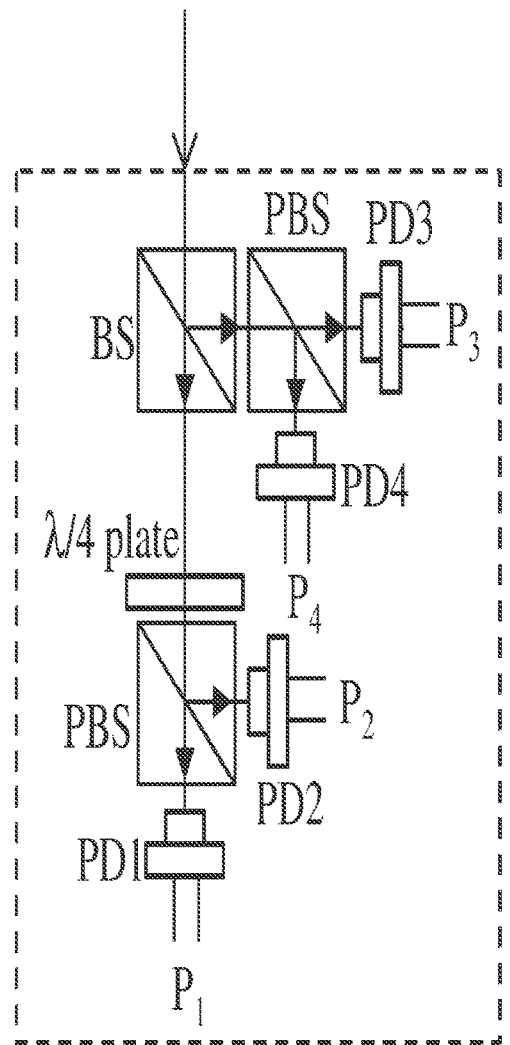
FIGS. 13A and 13B show an example of a third implementation of a polarization analyzer where
Figure 13B:
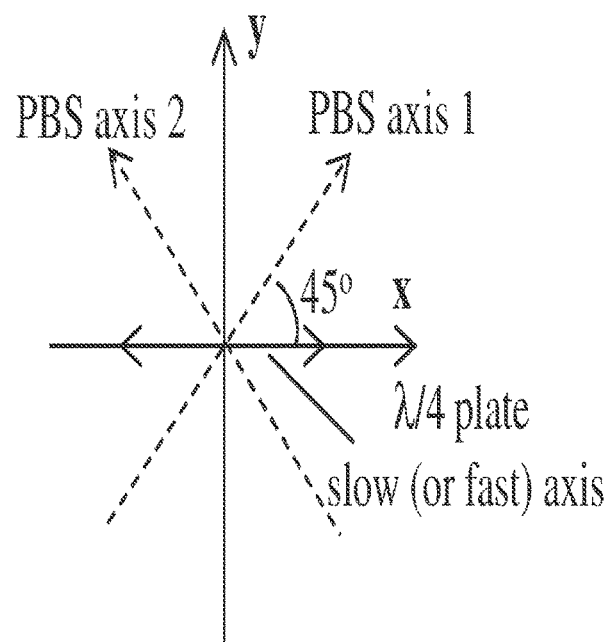

A short coming of the embodiment of FIG. 11 is that the rotation induced phase cannot exceed 90 degrees, as shown in Eqs. (20) and (24) and can only be used for gyros with small rotation rate or dynamic range. For gyros with a large detection range, a third embodiment shown in FIG. 13 can be used. In this embodiment, a polarization insensitive BS is used to split the incoming beam into two parts. In the first part, a PBS is used after the quarter wave plate for polarization analysis. The quarter wave plate's slow (or fast) axis is aligned with the x axis of the PBS in FIG. 7 or the Wollaston prism in FIGS. 8 and 9 to introduce $\pi/2$ phase retardation. In the second part, a PBS is used without a quarter wave plate for polarization analysis. Similar to Eqs. (22) and (23), the detected photocurrent in PD1 and PD2 are:

$$I'_1 = \beta_1(\alpha E_0^2/4)(1+\sin \Delta\phi) = I'_{10}(1+\sin \Delta\phi) \quad (25)$$

$$I'_2 = \beta_2(\alpha E_0^2/4)(1-\sin \Delta\phi) = I'_{20}(1-\sin \Delta\phi) \quad (26)$$

The detected photocurrents in PD3 and PD4 are:

$$I'_3 = \beta_3(\alpha E_0^2/4)(1+\cos \Delta\phi) = I'_{30}(1+\cos \Delta\phi) \quad (27)$$

$$I'_4 = \beta_4(\alpha E_0^2/4)(1-\cos \Delta\phi) = I'_{40}(1-\cos \Delta\phi) \quad (28)$$

Adjusting detection circuit parameters $\beta_1$, $\beta_2$, $\beta_3$, and $\beta_4$ such that $I'_{10} = I'_{20}$ and $I_{30} = I_{40}$, and using balanced amplification, one obtains:

$$V_{12} = G_{12}(I'_1 - I'_2) = G_{12}I'_{10} \sin \Delta\phi \quad (29)$$

$$V_{34} = G_{34}(I_3 - I_4) = G_{34}I_{30} \cos \Delta\phi \quad (30)$$

where $G_{12}$ and $G_{34}$ are the trans-impedance gain of the balanced detection circuits of detector pairs (PD1,PD2) and (PD3, PD4) respectively. The rotation induced phase can then be obtained as:

$$\Delta\phi = \tan^{-1}[V_{12}G_{34}I_{30}/(V_{34}G_{12}I'_{10})] \quad (31)$$

Adjusting circuit gains $G_{12}$ and $G_{34}$ such that $G_{34}I_{30} = G_{12}I'_{10}$, we obtain:

$$\Delta\phi = \tan^{-1}(V_{12}/V_{34}) \quad (32)$$

In the derivations from Eq. (29) to Eq. (32), balanced detection circuitry as shown in FIG. 12B are used. Alternatively, separate amplifier circuitry as shown in FIG. 12A can also be used. Such a configuration eliminates any power fluctuations of the light source and therefore can be used for making a gyro with highest accuracy. One may use Eq. (32) for obtaining $\Delta\phi$. However, at small rotation rate with a small $\Delta\phi$, $\Delta\phi$ can be obtained using Eq. (29) only. When the absolute value of $\Delta\phi$ approaches $\pi/2$, Eq. (30) can be used alone for obtaining $\Delta\phi$, because Eq. (29) is at minimum sensitive point as $\Delta\phi$ changes. One may using Eq. (29) and (30) alternatively for obtaining $\Delta\phi$, depending on its absolute value.

Figure 14A:
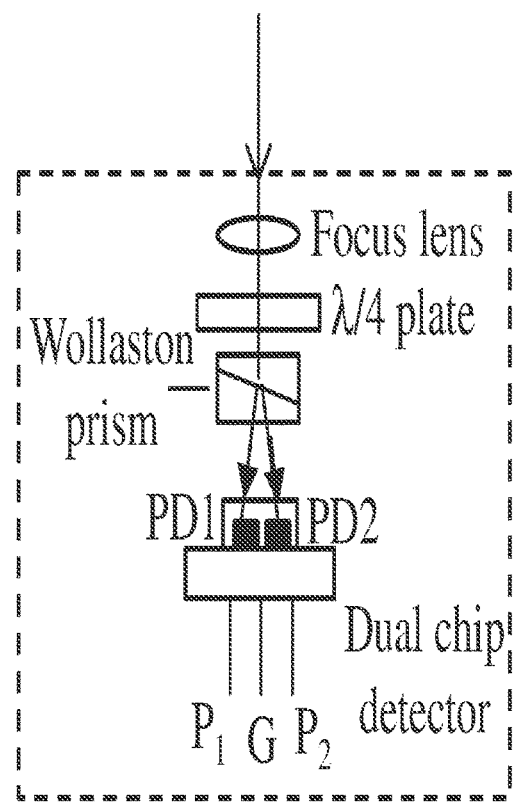
FIGS. 14A and 14B show an example of a fourth implementation of a polarization analyzer in which a Wollaston prism is used to replace the PBS in FIG. 10 and a dual chip photodetector (PD) is used to replace the two separate PDs.
Figure 14B:
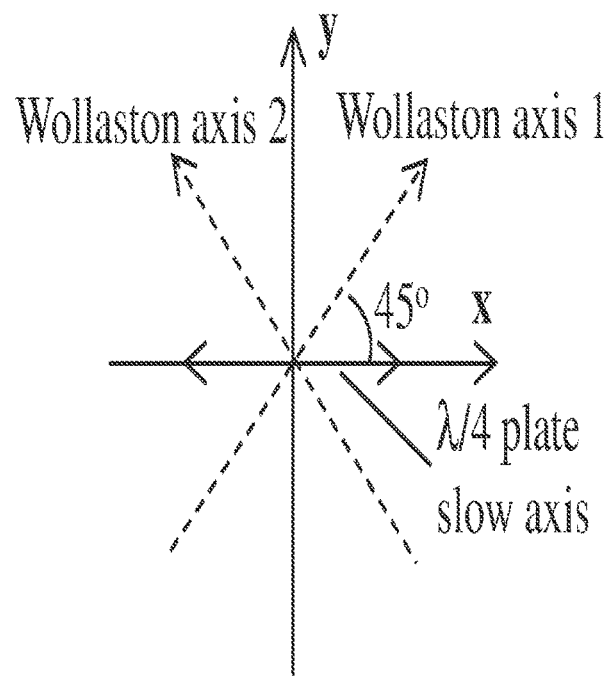

FIG. 14A shows a fourth embodiment of a polarization analyzer in which a Wollaston prism is used to replace the PBS in FIG. 11 and a dual chip photodetector (PD) is used to replace the two separate PDs. The two PD chips in a dual chip detector have a size from 50 to 500 microns and are separated in space by around 50 to 500 microns. Other chip sizes and spacings are also possible. The two chips are electrically isolated from each other. Each of the polarization components of the incoming light beam is focused by a lens on to a corresponding chip to produce a photocurrent. The advantage of this configuration is the small size and low cost. In addition, the Wollaston prism generally has a better polarization extinction ratio that the thin film polarization beam splitting cubes in FIG. 11. FIG. 14B shows the desired directions of the Wollaston prism's axis and the quarter wave plate with respect to the directions x and y of the polarization beam splitter before the fiber coil.

FIG. 15A shows a fifth embodiment of a polarization analyzer in which a Wollaston prism is used to replace the PBS in FIG. 12 and two dual chip photodetector (PD) are used to replace the two pairs of separate PDs. FIG. 15B shows the desired directions of a Wollaston prism's axis and the quarter wave plate with respect to the directions x and y of the polarization beam splitter before the fiber coil. The two Wollaston prisms have the same orientation with respect to x and y directions.

Figure 16:
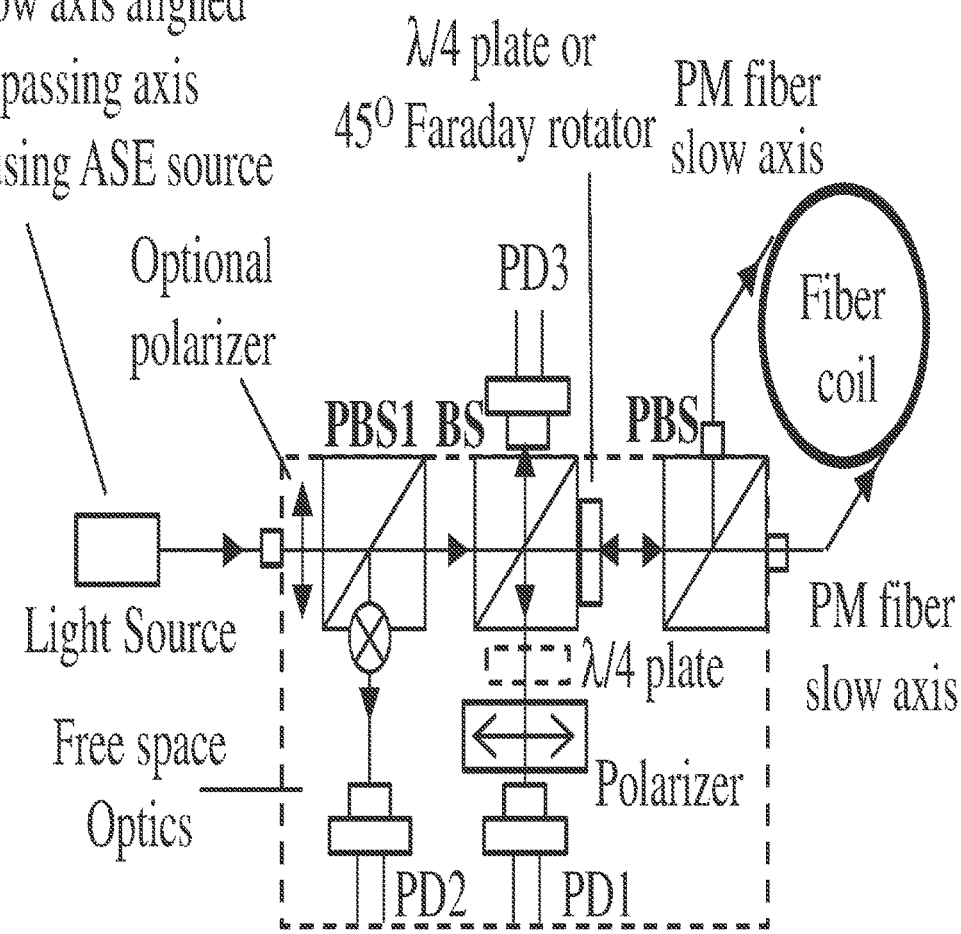
FIG. 16 shows an example of a sixth implementation of a polarimetric fiber optic gyroscope (P-FOG). If a polarized light source is used, PM fiber pigtail should be used to couple light into the dotted box. If a depolarized light source is used, such as a ASE source, a SM fiber pigtail should be used. An optional polarizer can be used to polarize the light source in case the extinction ratio of PBS1 is not sufficient. The light source can also be integrated inside the dotted box in a chip format to reduce the size and cost. In this case, no fiber pigtail is required for the light source. Two polarizing (PZ) fiber pigtails can be used to replace the two PM fiber pigtails for better performance. If the 45° Faraday rotator is used, instead of the quarter wave plate at the right hand side of BS, a quarter wave plate (dotted line) should be used before the polarizer, where the principal axes of the plate should be aligned with the principal axes (x,y) of the PBS.

FIG. 16 illustrates a sixth implementation of a polarimetric fiber optic gyroscope (P-FOG). In this configuration, the input polarization from the light source is aligned with a principal axis of PBS1 and will pass through PBS1 without any loss. The beam then passes through a polarization insensitive beam splitter (BS) and a quarter wave plate before being split into two orthogonally polarized beams by the PBS. An optional photodetector, PD3, can be used to monitor the optical power from the light source. The quarter wave plate is oriented 45° with respected to the input polarization and the principal axes x and y of PBS. After returning from the fiber coil, part of the beam will be reflected by the BS towards polarizer and PD1. The polarizer is oriented 45° from x and y. The other part will pass through BS and totally reflected by PBS1 towards PD2. The photocurrents generated in PD1 and PD2 are:

$$I''_1 = \beta_1(\alpha_1 E_0^2/2)(1-\sin \Delta\phi) = I''_{10}(1-\sin \Delta\phi) \quad (33)$$

$$I''_2 = \beta_2(\alpha_2 E_0^2/2)(1+\cos \Delta\phi) = I''_{20}(1+\cos \Delta\phi) \quad (34)$$

where $\beta_i$ is the circuit gain, including the responsivity of PDi and $\alpha_i$ is the optical loss of beam i. $I''_{10}$ and $I''_{20}$ can be obtained when the gyro is stationary ($\Delta\phi=0$), assuming the optical power does not change. To avoid the error induced by power drift, the photocurrent $I''_3$ of PD3 can be used.

Adjusting circuit gains such that $I''_3 = I''_{10} = I''_{20}$, the rotation induced phase can be obtained as:

$$\Delta\phi = \tan^{-1}[(I''_1 - I''_3)/(I''_2 - I''_3)] \quad (35)$$

Because there is a large relative delay between signals in PD3 and signals in PD1 and PD2, caused by the delay of the fiber coil, light source's intensity noise will degrade the measurement accuracy of $\Delta\phi$ in Eq. (35).

In FIG. 16, the light source can also be integrated inside the dotted box in a chip format to reduce the size and cost. In this case, no PM fiber pigtail is required for the light source.

Figure 17:
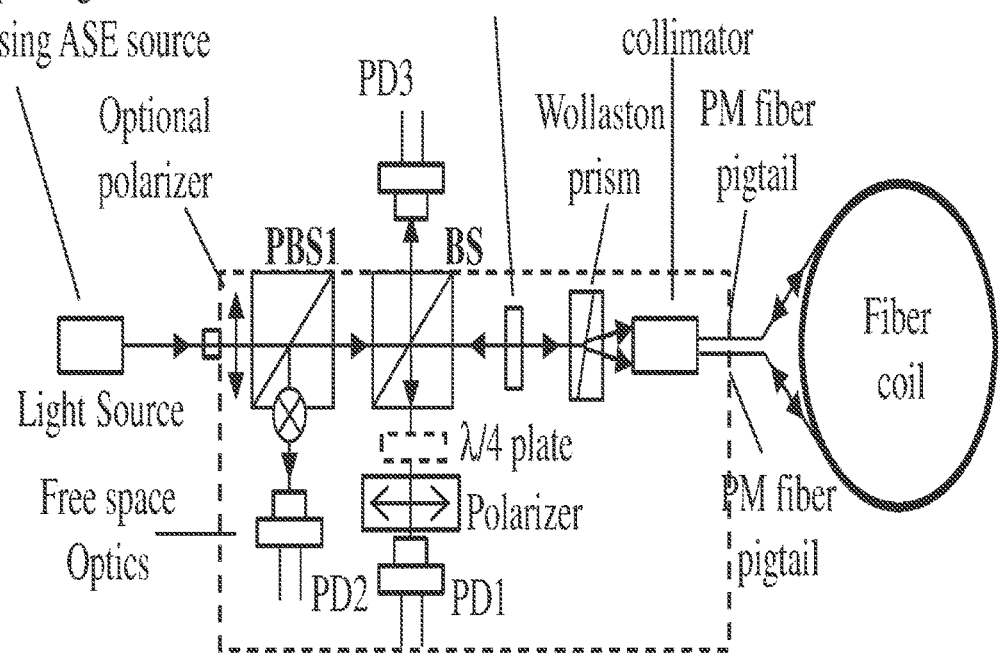
FIG. 17 shows an example of a seventh implementation of a polarimetric fiber optic gyroscope (P-FOG). If a polarized light source is used, PM fiber pigtail should be used to couple light into the dotted box. If a depolarized light source is used, such as a ASE source, a SM fiber pigtail should be used. An optional polarizer can be used to polarize the light source in case the extinction ratio of PBS1 is not sufficient. The light source can also be integrated inside the dotted box in a chip format to reduce the size and cost. In this case, no fiber pigtail is required for the light source. Two polarizing fiber pigtails can also be used to replace the two PM fiber pigtails for better performance. If the 45° Faraday rotator is used, instead of the quarter wave plate at the right hand side of BS, a different quarter wave plate (dotted line) should be used before the polarizer, where the principal axes of the plate should be aligned with the principal axes (x,y) of the Wollaston prism.

FIG. 17 shows a seventh implementation of a P-FOG, where the PBS cube in FIG. 16 is replaced with a Wollaston prism. The rest are identical to FIG. 16 and Eqs. (33) to (35) still apply.

Figure 18:
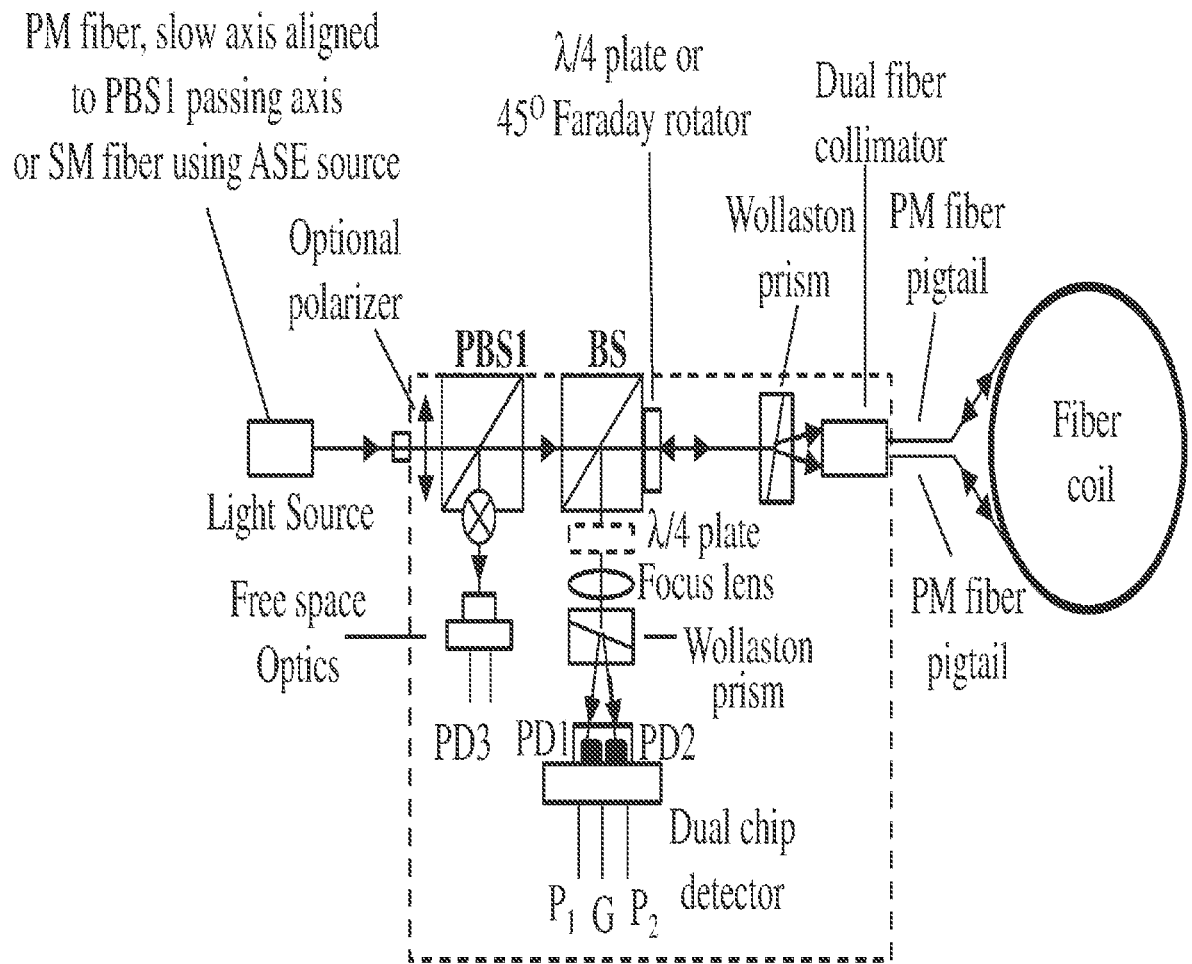
FIG. 18 shows an example of an eighth implementation of a polarimetric fiber optic gyroscope (P-FOG). If a polarized light source is used, PM fiber pigtail should be used to couple light into the dotted box. If a depolarized light source is used, such as a ASE source, a SM fiber pigtail should be used. An optional polarizer can be used to polarize the light source in case the extinction ratio of PBS1 is not sufficient. The light source can also be integrated inside the dotted box in a chip format to reduce the size and cost. In this case, no fiber pigtail is required for the light source. Two polarizing fiber pigtails can be used to replace the two PM fiber pigtails for better performance. If 45° Faraday rotator is used, instead of the quarter wave plate at the right hand side of BS, a different quarter wave plate should be used before the Wollaston prism, where principal axes of the plate should be aligned with the principal axes (x,y) of the two Wollaston prisms.

FIG. 18 illustrates an eighth implementation of a polarimetric fiber optic gyroscope (P-FOG). This configuration is similar to FIG. 17, except that the polarizer is replaced with a Wollaston prism and a dual chip detector is used to detect the photocurrents of the two polarization components from the prism. A PBS cube can also be used to replace the Wollaston prism. In this case, two separate photodetectors will be used replace the dual chip detector. The photocurrents $J_1$, $J_2$ and $J_3$ in PD1, PD2, and PD3 can be expressed as:

$$J_1 = \beta_1(\alpha_1 E_0^2/2)(1-\sin \Delta\phi) = J_{10}(1-\sin \Delta\phi) \quad (36)$$

$$J_2 = \beta_2(\alpha_2 E_0^2/2)(1+\sin \Delta\phi) = J_{20}(1+\sin \Delta\phi) \quad (37)$$

$$J_3 = \beta_3(\alpha_3 E_0^2/2)(1+\cos \Delta\phi) = J_{30}(1+\cos \Delta\phi) \quad (38)$$

Adjusting the circuit gains such that $J_{10} = J_{20} = J_{30} = J_0$, one obtains:

$$\sin\Delta\phi = (J_2 - J_1)/(J_2 + J_1) \quad (39)$$

$$\cos\Delta\phi = [2J_3/(J_1 + J_2) - 1] \quad (40)$$

$$\Delta\phi = \tan^{-1}\left[\frac{J_2 - J_1}{2J_3 - (J_2 + J_1)}\right] \quad (41)$$

The currents can also be converted into voltages before making the calculations. One may use Eq. (41) for obtaining $\Delta\phi$. However, at small rotation rate with a small $\Delta\phi$, $\Delta\phi$ can be obtained using Eq. (39) only. When the absolute value of $\Delta\phi$ approaches $\pi/2$, Eq. (40) can be used alone for obtaining $\Delta\phi$, because Eq. (39) is at minimum sensitive point as $\Delta\phi$ changes. One may using Eq. (39) and (40) alternatively for obtaining $\Delta\phi$, depending on its absolute value.

In FIGS. 16, 17, and 18, a depolarized light source, such as ASE source, can be used. A single mode (SM) fiber pigtail can be used for the light source. In addition, an optional polarizer may be used to polarized the light before light enters PBS1 in case the extinction ratio of PBS1 is not sufficient.

Figure 19A:
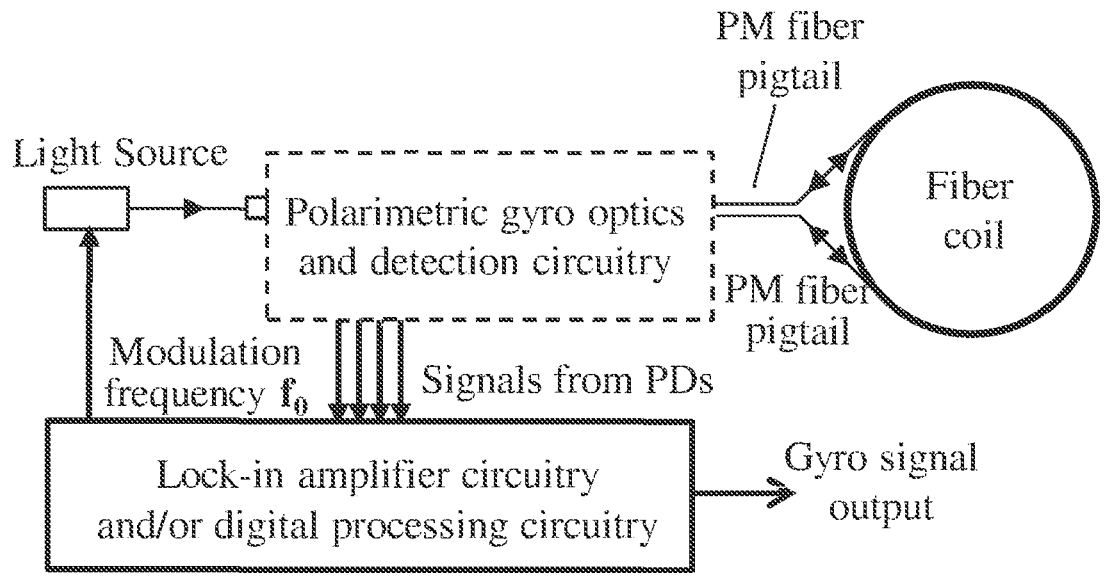
FIGS. 19A and 19B show two examples of detection devices designed to increase signal to noise ratio of the detected signals based on a lock-in amplification circuit.
Figure 19B:
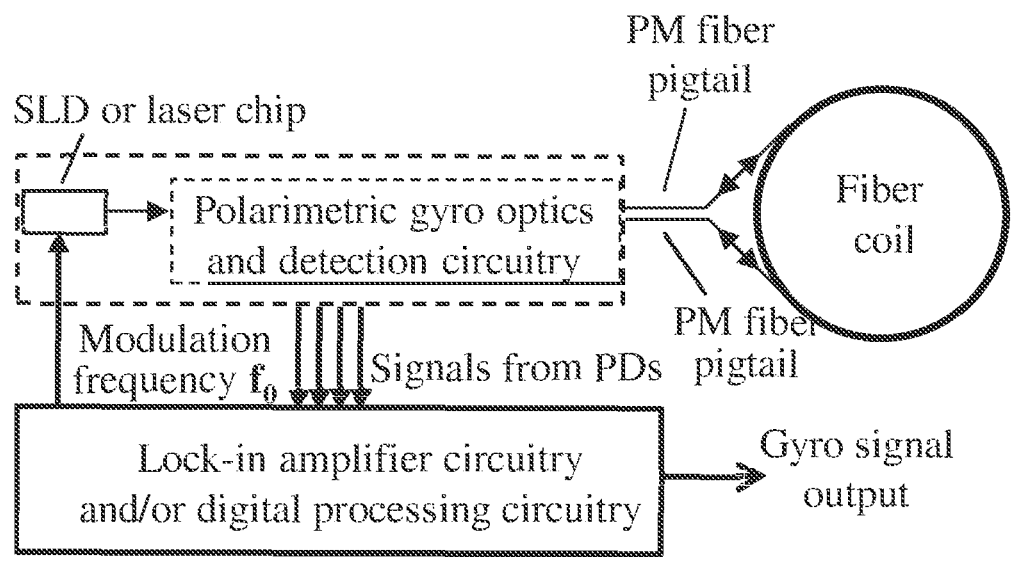

To further increase signal to noise ratio of the detected signals, lock-in amplification circuitry may be deployed, as shown by two device examples in FIGS. 19A and 19B. In this configuration, the lock-in amplifier circuit output a modulation signal with a frequency $f_0$ to modulate the light source and the signals from the PDs in the detection circuitry are fed into a lock-in amplifier with a narrow band pass filter centered at $f_0$. Under this design, the photodetectors can be AC coupled to get rid of the DC drift and low frequency noises. The modulation signal can be sine wave, square wave, saw wave, etc. The bandwidth of the band pass filter can be slightly larger than desired detection bandwidth of the gyro, on the order of 1 kHz. Because of the narrow band width, the detection noise can be significantly reduced. This lock-in amplification scheme can apply to other P-FOG configurations disclosed in this patent document. The light source can be external with a pigtail or internal inside the P-FOG optical package without a pigtail, as shown in FIGS. 19A and 19B.

Figure 20A:
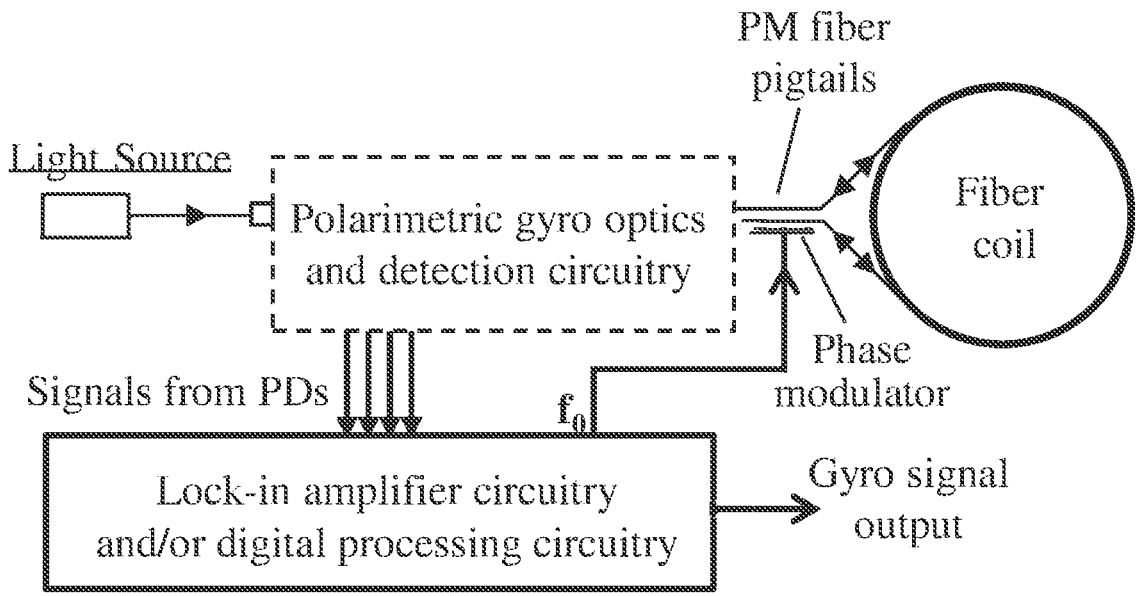
FIGS. 20A and 20B show two examples of detection devices designed to increase the signal to noise ratio of the detected signals based on a lock-in amplification circuit and an optical phase modulator.
Figure 20B:
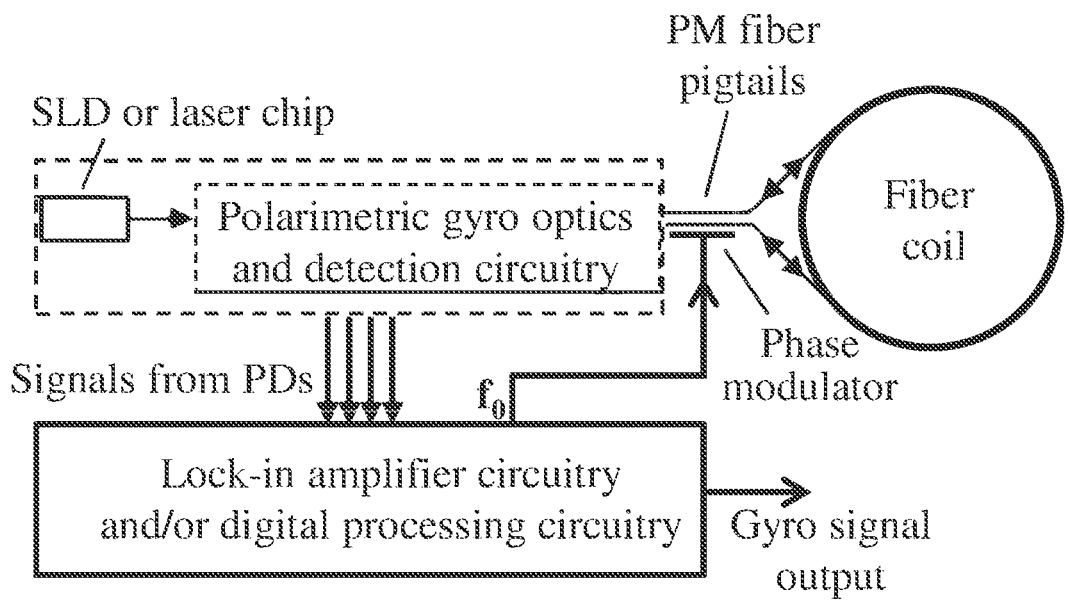

In some implementations, a phase modulator may be added to enable the lock-in amplification for noise reduction, as shown in FIG. 20A and FIG. 20B. This addition of phase modulator can add cost and complication to the resulting gyroscope. Unlike in a conventional IFOG, here the modulation depth can be very small because the gyro is already biased at the most sensitive point. With the phase modulation and lock-in amplification, the DC terms in Eq. (17), Eq. (22), Eq. (23), Eq. (25)-Eq. (28), Eq. (33), Eq. (34), and E. (36)-Eq. (38) can automatically be eliminated. In such cases, configurations of FIG. 10, FIG. 16, and FIG. 17 may be sufficient.

Figure 21:
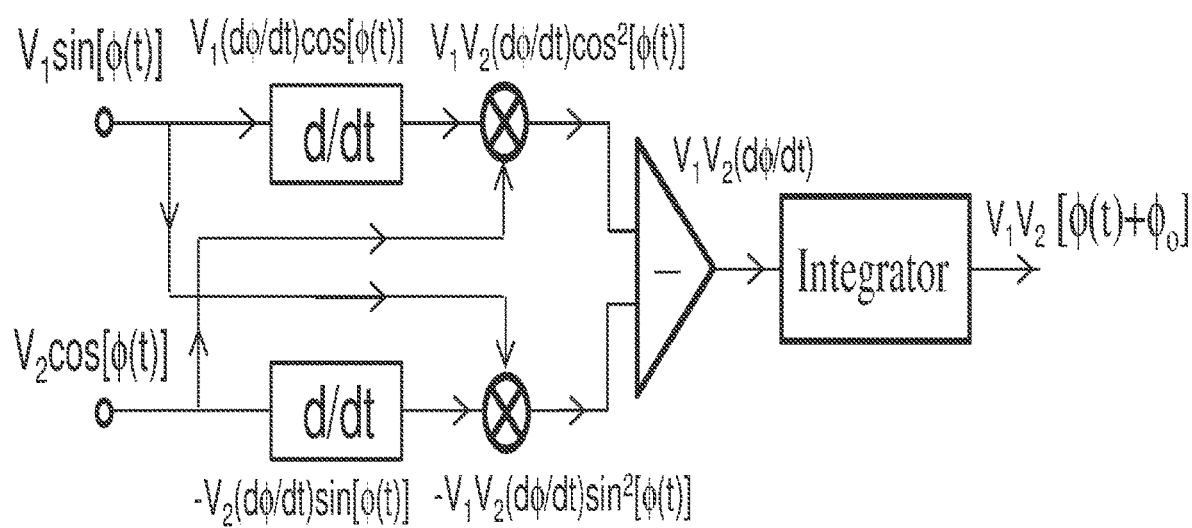
FIG. 21 shows an example of a circuit for the linearization of the detected rotation angle.

FIG. 21 shows an example of a circuit to solve the rotation induced phase in Eq. (29) and Eq. (30), where $G_{12}I'_{10}$ and $G_{34}I_{30}$ are represented by V1 and V2 respectively and $\Delta\phi$ is represented by $\phi(t)$. Such a circuit can also be realized by FPGA with firmware. Using such a circuit, a large rotation range can be obtained without encountering nonlinearity or with reduced nonlinearity in processing the signal.

The example circuit in FIG. 21 implements a method for sensing rotation based on sensing of optical polarization of light without relying on optical interferometry by the following operations. Before operating the circuit in FIG. 21 for sensing the rotation, an input optical beam with an input optical polarization is split into a first optical beam with a first optical polarization and a second optical beam with a second optical polarization that is orthogonal to the first optical polarization. The first and second optical beams are coupled into an input/output port of an optical loop to direct the first optical beam to propagate in the optical loop in a first loop direction and the second optical beam to propagate in the optical loop in a second loop direction opposite to the first loop direction. The light of the first and second optical beams is combined at the input/output port without causing optical interference between the first and second optical beams at the input/output port, to produce a combined optical beam as an optical output of the optical loop for sensing a rotation of the optical loop based on a phase difference between the two counter propagating optical beams in the optical loop that is caused by the rotation. The phase difference is linearly proportional to a rotation rate of the rotation. Next, the optical output is optically split into first and second output beams that represent a sine function and a cosine function, respectively, of the phase difference between the counter propagating optical beams in the optical loop that is caused by the rotation of the optical loop.

Next, the circuit in FIG. 21 is operated to process the first and second optical beams for sensing the rotation. Two optical detectors are used to generate the two input signals to the circuit in FIG. 21. A first optical detector is operated to receive the first optical output beam to produce a first detector signal ($V_1 \sin \phi$) representing the sine function of the phase difference between the counter propagating optical beams in the optical loop that is caused by the rotation of the optical loop; and the second optical detector is operated to receive the second optical output beam to produce a second detector signal ($V_2 \cos \phi$) representing the cosine function of the phase difference between the counter propagating optical beams in the optical loop that is caused by the rotation of the optical loop. The circuit produces a time derivative of the first detector signal, ($V_1(d\phi/dt)\cos \phi$), in a first derivative circuit (indicated by the upper box "d/dt"), and multiplies this time derivative and the second detector signal at a first multiplier circuit to produce a first processed signal ($V_1 V_2 (d\phi/dt)\cos^2 \phi$) as shown in the upper branch of the circuit in FIG. 21. Similarly, the circuit produces a time derivative of the second detector signal, ($-V_2(d\phi/dt)\sin \phi$), in a second derivative circuit (indicated by the lower box "d/dt"), and multiplies this time derivative and the first detector signal at a second multiplier circuit to produce a second processed signal ($-V_1 V_2(d\phi/dt)\sin^2 \phi$) as shown in the lower branch of the circuit in FIG. 21.

Next, the circuit in the circuit in FIG. 21 processes the first and second processed signals to determine the rotation of the optical loop based on the sine function and cosine function of the phase difference between the counter propagating optical beams in the optical loop. This processing includes using a differentiator or sum circuit as in the specific example in FIG. 21 to use the first and the second processed signals to produce a signal representing $V_1 V_2(d\phi/dt)$ and using an integrator to produce an integrated signal containing the phase difference: $V_1 V_2(\phi+\phi_o)$. This phase difference can be used to determine the rotation of the optical loop. In the example shown in FIG. 21, the second processed signal has an opposite sign relative to the first processed signal.

In implementing the signal processing in FIG. 21, a signal modulation may imposed onto at least one of the first and second optical beams in the optical loop to carry the signal modulation and a frequency of the signal modulation and a lock-in amplifier can be used for detecting the optical output to obtain information on optical polarization of the optical output to reduce detection noise. Specifically, for example, the input optical beam may be modulated to carry the signal modulation before splitting the input optical beam into the first optical beam and the second optical beam. For another example, a light source that produces the input optical beam to make the input optical beam and the first and second optical beams can be modulated to carry the signal modulation.

In specific implementations, the first and second output beams contain two different Stokes parameters $s_2$ and $s_3$ of the optical output representing a cosine function and a sine function of the phase difference $\phi$ between the counter propagating optical beams in the optical loop and the Stokes parameters $s_2$ and $s_3$ are processed to determine the rotation rate of the optical loop. Referring to FIG. 21, the processing of the Stokes parameters $s_2$ and $s_3$ to determine the rotation rate of the optical loop includes: performing time derivatives of $s_2$ and $s_3$ to produce $ds_2/dt$ and $ds_3/dt$; multiplying $s_2$ with $ds_3/dt$, the time derivative of $s_3$, to produce $s_2*ds_3/dt$; multiplying $s_3$ with $ds_2/dt$, the time derivative of $s_2$, to produce $s_3*ds_2/dt$; summing $s_2*ds_3/dt$ and $s_3*ds_2/dt$ to obtain a time derivative of the phase difference $\phi$ between the two counter propagating optical beams in the optical loop that is caused by the rotation as $d(\phi)/dt$; and integrating $d(\phi)/dt$ over time to obtain the phase difference $\phi$.

In some implementations, the optical output of the optical loop may be processed to obtain the information on optical polarization of the optical output by the following processing steps. The optical output is first split into four different optical beams of an equal power level. A 0-degree polarizer is placed in the first beam, followed by a first photodetector, to produce a first detector signal $P_1$; a 90-degree polarizer is placed in the second beam, followed by a second photodetector, to produce a second detector signal $P_2$; a 45-degree polarizer is placed in the third beam, followed by a third photodetector, to produce a third detector signal $P_3$; and a circular polarizer is placed in the fourth beam, followed by a fourth photodetector, to produce a fourth detector signal $P_4$. Next, the four detector signals to obtain four Stokes parameters are processed:

$$S_0 = P_1 + P_2,$$

$$s_1 = (P_1 - P_2)/S_0,$$

$$s_2 = \cos(\Delta\phi) = (2P_3 - S_0)/S_0, \text{ and}$$

$$s_3 = \sin(\Delta\phi) = (2P_4 - S_0)/S_0.$$

In implementations, the above circular polarizer may be implemented by a quarter wave plate followed by a linear polarizer. In implementations, the processing of the optical output of the optical loop to obtain the information on optical polarization of the optical output can include splitting the optical output into a first analyzing beam and a second analyzing beam; introducing approximately 90 degree phase to the phase difference Δφ between the two counter propagating optical beams in the first analyzing beam; splitting the first analyzing beam into a first polarization beam and a second polarization beam orthogonal in polarization to the first polarization beam; detecting the first polarization beam to produce a first detector signal $V_1$; detecting the second polarization beam to produce a second detector signal $V_2$; calculating Stokes parameter $s_3$ from sin(Δφ) which is a function of $V_1$ and $V_2$; splitting the second analyzing beam into a third polarization beam and a fourth polarization beam orthogonal to the first polarization beam; detecting the third polarization beam to produce a third detector signal $V_3$; detecting the fourth polarization beam to produce a fourth detector signal $V_4$; and calculating the Stokes parameter $s_2$ from cos(Δφ) which is a function of $V_3$ and $V_4$.

In the above implementation examples, the detection of the optical polarization of the output light from the optical loop can be implemented in various ways. Some examples of optical polarization analyzers or polarimeter devices that may be used for the present optical gyroscopes based on sensing of optical polarization are provided in the following 4 U.S. patents that are incorporated by reference as part of the disclosure of this document:

1. X. Steve Yao, U.S. Pat. No. 6,836,327, "In-line optical polarimeter based on integration of free-space optical elements," 2004.
2. X. Steve Yao, U.S. Pat. No. 7,372,568, "Low cost polametric detector," 2008.
3. X. Steve Yao, U.S. Pat. No. 7,436,569, "Polarization measurement and self-calibration based on multiple tunable optical polarization rotators," 2008.
4. X. Steve Yao, U.S. Pat. No. 7,265,837, "Sensitive polarization monitoring and controlling," 2007.

In the above examples of a polarimetric fiber optic gyroscope (P-FOG), the non-polarization beam splitter (BS) in FIGS. 7, 8, and 9 may be replaced with a special polarization beam splitter (SPBS) and use modified optics downstream for signal detection.

Figure 22A:
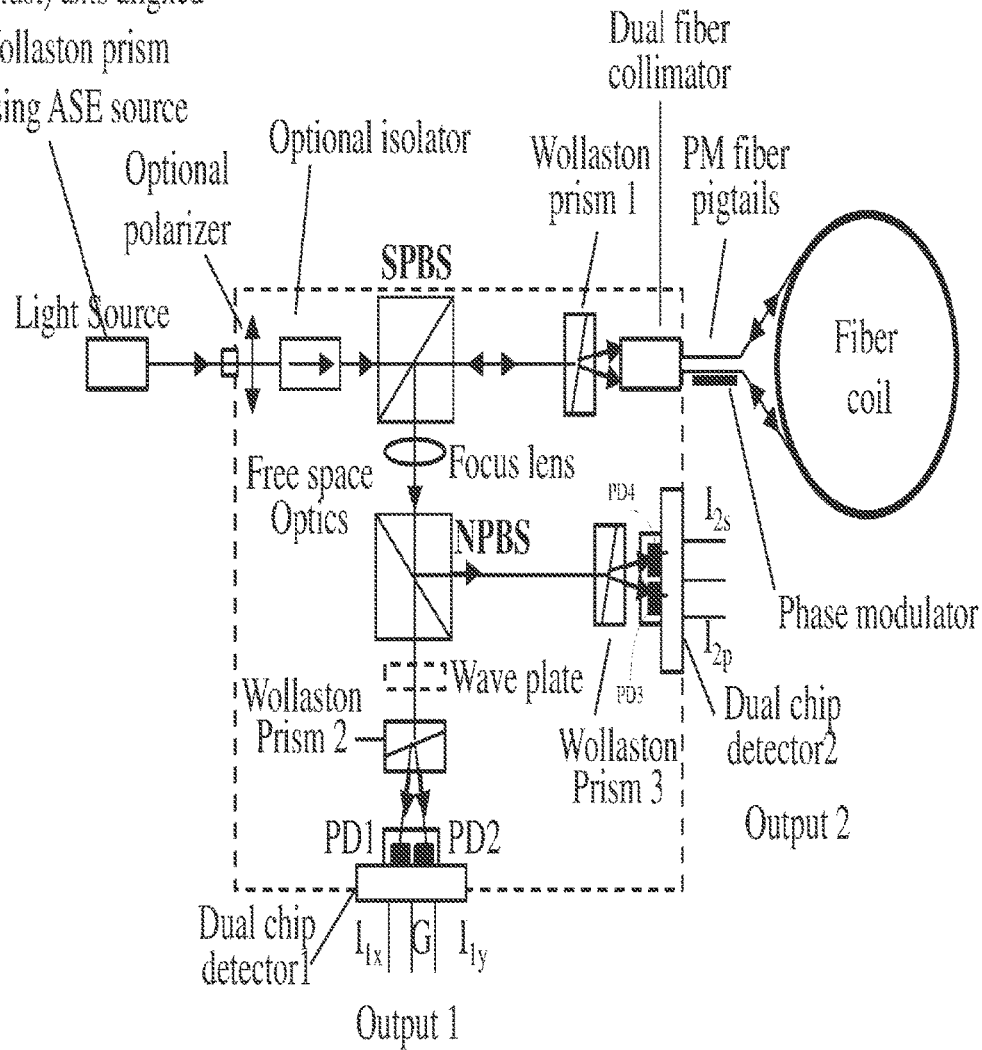
FIG. 22A illustrates an example of a polarimetric fiber optic gyroscope (P-FOG) in which the beam splitter (BS) in FIGS. 7, 8, and 9 is replaced with a special polarization beam splitter (SPBS).

FIGS. 22A, 22B and 22C show an example for using such a SPBS where FIG. 22A shows a specific example of the optical layout of a non-interferometric optical gyroscope device and FIGS. 22B and 22C show operational features of the device in FIG. 22A. In particular, the SPBS in the device in FIG. 22A can be designed to transmit about 90% light in the p polarization, and reflect close to 100% of the light in the s polarization and a small portion of p polarization, for example, 10%, as shown in FIG. 22B. As illustrated in FIG. 22A, the light beam of p polarization from the light source first passes through the SPBS and then enters Wollaston prism 1 which is oriented at 45 degrees to the p polarization, as shown in FIG. 22C, to equally separate the beam into two beams in two polarization directions which are coupled into two PM fibers by the dual fiber collimator to be coupled in to a fiber coil or loop in opposite directions as two counter propagating light beams that experience different phases in connection with the rotation of the optical loop. In one implementation, for example, the two PM fiber pigtails are then fusion spliced to a fiber coil to form a closed loop. The two counter propagating light beams returning from the fiber loop are recombined by Wollaston prism 1 and are directed back towards SPBS. The rotation of the fiber coil or loop introduces a phase shift between the two counter propagating light waves and produces a small portion of s polarization. After incident onto the SPBS, the rotation induced light beam in the s polarization is 100% reflected by the SPBS to co-propagate with the small portion of light beam in the p polarization reflected by SPBS. A non-polarization beam splitter (NPBS) is placed below the SPBS to separate the reflected light beam from the SPBS into two different beams in two directions: one beam goes through a wave plate with its axes aligned with the s and p polarization axes of the SPBS before entering Wollaston prism 2 which is oriented at 45 degrees from s and p polarizations to separate the beam into two directions along two different optical paths which are then focused or directed onto two photodetectors PD1 and PD2 in a dual chip detector 1 (output 1); and the other beam goes to Wollaston prism 3 with its axes oriented with respect to the s and p polarizations to split the beam into two directions along two different optical paths which are separately focused or directed onto two photodetectors PD3 and PD4 on another dual chip detector 2 (output 2). The rotation induced phase difference in the optical loop can be uniquely obtained with the signals obtained from the four photodetectors PD1, PD2, PD3 and PD4 in the two detector chips.

The following section turns to the operation of the gyroscope device in FIG. 22A. Let $t_p$ be the transmissivity of p polarization, $r_p$ and $r_s$ be the field reflectivities of p and s polarizations of the SPBS, respectively, $E_0$ is the amplitude of light entering SPBS, and β be the total field loss of Wollaston prism 1 and the fiber loop. For the purpose of explaining a particular operation of the device in FIG. 22A, it is assumed that the field of the light beam entering SPBS be in the p polarization and the field transmission of the NPBS for both s and p polarizations be $t_n$. The optical power difference entering into PD1 and PD2 of the dual chip detector 1 can be expressed as:

$$\Delta P_{12} = (\beta t_p t_n E0)^2 r_s r_p \sin\delta \sin\phi_r \quad (42)$$

where $\delta = \delta_{sp} + \delta_w$ is the total differential phase between the s and p polarization components from the SPBS ($\delta_{sp}$) and the wave plate ($\delta_w$) respectively, and $\phi_r$ is the rotation induced phase between the counter propagating waves with the following relation with respect to the rotation rate Ω:

$$\phi_r = (2\pi D/\lambda_0)(nL/c)\Omega = (2\pi D/\lambda_0)\tau\Omega. \quad (43)$$

where D is the fiber coil diameter, $\lambda_0$ is the center wavelength of the light source, L is the length of the fiber coil, n is the effective index of refraction of the fiber, and t is the propagation time of light through the fiber coil. It is evident that the rotation induced phase is linearly proportional to the coil rotation rate.

In this example, the ideal condition is for δ to be π/2 to yield optimal detection sensitivity, as indicated in Eq. (42). If $\delta_{sp}=0$, the wave plate should be chosen to have a retardation of λ/4. For SPBS with non-zero $\delta_{sp}$, the retardation of the wave plate should be chosen so that $\delta_w = \pi/2 - \delta_{sp}$. Let $\delta = \pi/2 + \Delta(T)$, where Δ(T) is the residual phase and is a function of temperature T, the differential power measured at PD1 and PD2 of the dual chip detector 1 in Eq. (42) can be expressed as:

$$\Delta P_{12} = (\beta t_p t_n E0)^2 r_s r_p \cos\Delta(T) \sin\phi_r \quad (44)$$

Under this situation, the differential power is insensitive to temperature T while the retardation of the wave plate and the SPBS may depend on the temperature T. The effect of this temperature dependence of the wave plate and the SPBS may slightly affect the scale factor of the gyroscope and can be calibrated out if the output of the gyroscope at different temperatures is measured with a fixed rotation rate, such as the earth rotation. By accurately measuring the power difference with PD1 and PD2, the rotation induced phase at a small rotation rate between the counter propagating waves can be precisely obtained, and the measurement of this rotation induced phase can be practically free of any temperature effect. In implementations, the PD1 and PD2 can be either configured in a balanced detection configuration as illustrated in FIG. 12B or another detection configuration as shown in FIG. 12A.

The optical power difference entering PD3 and PD4 of the dual chip detector 2 can be expressed as:

$$\Delta P_{34} = (\beta t_p r_n r_p E_0)^2 \cos \phi_r \quad (45)$$

where $r_n$ is the reflectivity for both s and p polarizations of the NPBS. Based on Eq. (45), the output from other port of the NPBS (output 2) is sensitive to the consine of the rotation induced phase and the output contains no contributions from the differential phase of the SPBS and NPBS. Therefore, at a large rotation rate where the output 1 is no longer sensitive to rotation, this output can be used to accurately and sensitively obtain the rotation information. Therefore, at a large rotation rate, by accurately measuring the power difference with PD3 and PD4, the rotation induced phase between the counter propagating waves can be precisely obtained, without significant impact by any temperature effect. Similar to PD1 and PD2, PD3 and PD4 can be either configured in the balanced detection configuration as illustrated in FIG. 12B or the detection configuration illustrated in FIG. 12A.

The technology shown in FIGS. 22A, 22B and 22C can be implemented in various configurations to include the following features to improve the performance and manufacturability of the P-FOG: 1) the addition of the NPBS and the dual chip detector 2 to obtain cosine term of the rotation induced phase to expand the dynamic range to infinite; 2) The introduction and use of the dual chip photo detector and Wollaston prism combination to significantly reduce the size of the detection optics and enable tight integration; 3) the introduction and use of the fiber pigtailed Wollaston prism and collimator combination for easy integration.

The above specific examples of polarimetric fiber optic gyroscopes (P-FOG) can be operated as open loop devices without having any feedback loop. When implemented for open loop operations, implementations of the disclosed gyroscope devices may inherit certain technical problems associated with various open loop fiber gyros, such as poor scale factor.

In recognition of the above, closed loop polarimetric fiber optic gyroscopes (P-FOG)s can be designed to overcome the short comings of the open loop gyros. Compared with the some implementations of closed loop fiber optic gyroscopes (FOG), the closed loop P-FOGs disclosed herein can be configured to provide one or more advantages.

For example, the speed of phase modulator used in P-FOG can be much slower, making it possible to use a much lower cost phase modulator to replace the high speed LiNbO3 modulator used in the conventional closed loop FOG. For example, a low cost phase modulator based on stretching or compressing a section of fiber can be used.

For another example, the light source used can be lower cost light sources, such as a vertical-cavity surface-emitting laser (VCSEL) or an inexpensive diode laser used in compact disk (CD) drives or other devices, because the power fluctuation of the laser can be canceled out by using a balanced detection scheme.

For another example, the light source used can be lower cost light sources, such as a vertical-cavity surface-emitting laser (VCSEL) or an inexpensive diode laser used in compact disc (CD) drives or other devices, because the power fluctuation of the laser can be canceled out by using a balanced detection scheme.

For yet another example, the optical gyroscope devices disclosed in this document can be designed to reduce the phase or amplitude noise of the gyro detection circuit below the fundamental noise floor and hence making it possible to achieve much higher detection precision beyond the fundamental limit of the conventional closed loop FOG. The optical gyroscope devices disclosed in this document can be constructed as low cost FOGs to be attractive to various applications, including, e.g., driverless cars, unmanned aerial vehicles (UAV), and other applications requiring high to medium accuracy in rotation sensing at a low cost. In such systems, implementations of various MEMS based gyros do not have sufficient accuracy and stability for the intended applications.

Figure 23:
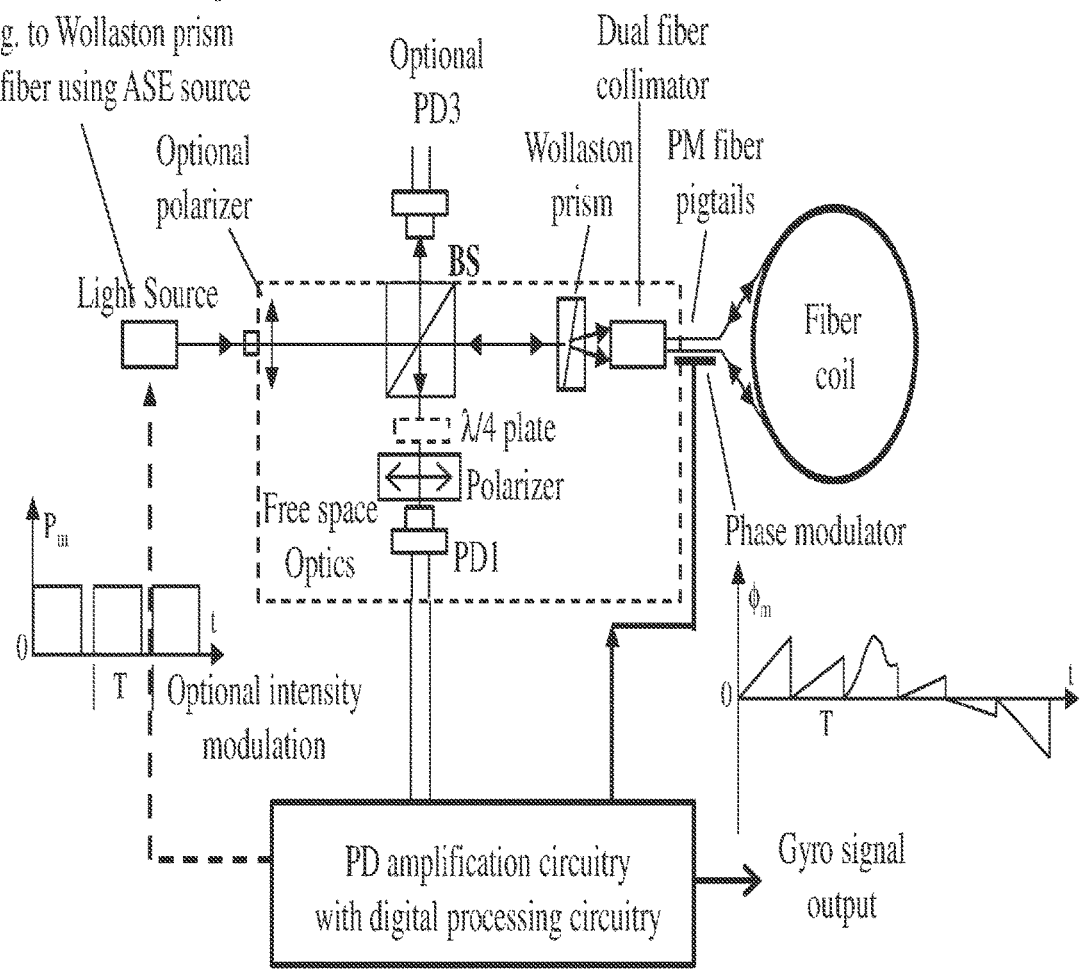
FIG. 23 shows a first example of a closed loop polarimetric fiber optic gyroscope (P-FOG). If a polarized light source is used, PM fiber pigtail should be used to couple light into the dotted box. If a depolarized light source is used, such as a ASE source, a SM fiber pigtail should be used. The light source can also be integrated inside the dotted box in a chip format to reduce the size and cost. In this case, no fiber pigtail is required for the light source. An optional polarizer can be used to polarize the light source in case an ASE source is used. Two polarizing fiber (PZ) pigtails can also be used to replace the two PM fiber pigtails for better performance. Note that the PD1 can be replaced with a fiber collimator to couple light into an optical fiber. The output of the fiber is then coupled into a PD.

FIG. 23 shows an example of a closed loop polarimetric fiber optic gyroscope (P-FOG). A Wollaston prism and a downstream dual fiber collimator are used to direct two optical beams in orthogonal polarizations as counter propagating beams into the optical fiber coil or loop for optical sensing of the rotation of the fiber coil or loop. A beam splitter BS is provided to receive input light and to direct the input light to the Wollaston prism and to direct the returned light from the optical coil or loop via the Wollaston prism to an optical polarizer and then a photodetector PD1. An optional photodetector PD3 can be placed relative to the BS to monitor a power level of a reflected portion of the input light by the BS. The output of the photodetector PD1 is directed to PD amplification circuitry with digital processing circuitry which processes the output to produce a gyroscope signal output indicating the rotation rate of the optical fiber coil or loop. As shown, an optional quarter wave plate can be placed between BS and the polarizer to introduce a nominal phase difference of $\pi/2$ between the two orthogonal polarizations in the light from the BS.

The closed loop is provided, in this example, a slow phase modulator that is placed at one end of the fiber coil or loop and is driven by a modulation signal such as a saw wave generated by the signal processing circuit in response to the output from the photodetector PD1. The slow phase modulator produces a phase modulation as a modulation induced differential phase shift between the two counter propagating light waves in the fiber coil or loop is used to balance out the differential phase shift induced by the coil rotation. The slope of the saw wave generated by the signal processing circuit (e.g., digital processing circuitry) is such that the net differential phase is kept at zero, as discussed below with respect to Eq. (47). The other optical parts and their arrangement may be implemented in various ways, including, for example, the implementations as illustrated in FIGS. 7-10.

With the presence of the closed loop with the added phase modulator, the configuration having PD3 and PD4 for obtaining the cosine function of the rotation induced phase in FIG. 15A is no longer necessary because the net differential phase between the two counter propagation waves in the presence of the closed loop is kept at zero or near zero during the closed loop operation. The rotation induced phase is obtained from the slope of the saw wave generated for balancing out the rotation induced phase and is then used to determine the rotation rate.

In implementations where a polarized light source is used, a polarization maintaining (PM) fiber pigtail can be used to couple light from the light source into the portion of the optical gyroscope device in FIG. 23 marked by a dotted box. In implementations where a depolarized light source is used, such as a light source producing light of Amplified Spontaneous Emission (ASE) with a broad spectral band, a single mode (SM) fiber pigtail can be used t couple light from the light source into the portion of the optical gyroscope device in FIG. 23 marked by a dotted box. The light source can also be integrated inside the dotted box in a chip format to reduce the size and cost. In this case, no fiber pigtail is required for the light source. An optional polarizer can be used to polarize the light from the light source in certain implementations, e.g., when an ASE source is used as the light source. Two polarizing fiber (PZ) pigtails can also be used to replace the two PM fiber pigtails for better performance. Note that the PD1 can be replaced with a fiber collimator to couple light into an optical fiber. The output of the fiber is then coupled into a PD.

In order to eliminate the potential DC or low frequency drift of the photodetector amplification circuit, the photodetector amplification circuit may be AC coupled so that the photodetector amplification circuit just passes and amplifies the AC components of the signal while blocking the DC component or low frequency components. Therefore, the signal received is of an AC format due to this operation. To facilitate such a circuit design, the light from the light source can be modulated. A circuit can be provided to modulate the input optical beam at an input light modulation frequency, and, in detecting the optical output of the optical loop, the detection circuit can be designed to selectively extract information carried by the optical output at the input light modulation frequency while filtering out DC or low frequency signal components. This can be done using a lock-in amplifier circuitry. One suitable modulation format in some implementations is square wave modulation, with a periodicity the same as that of the saw wave for modulating the phase modulator, as shown in FIG. 23. One option is to keep the on time of the modulation as close to the periodicity as possible, e.g., 90% of the periodicity in some implementations.

Figure 24:
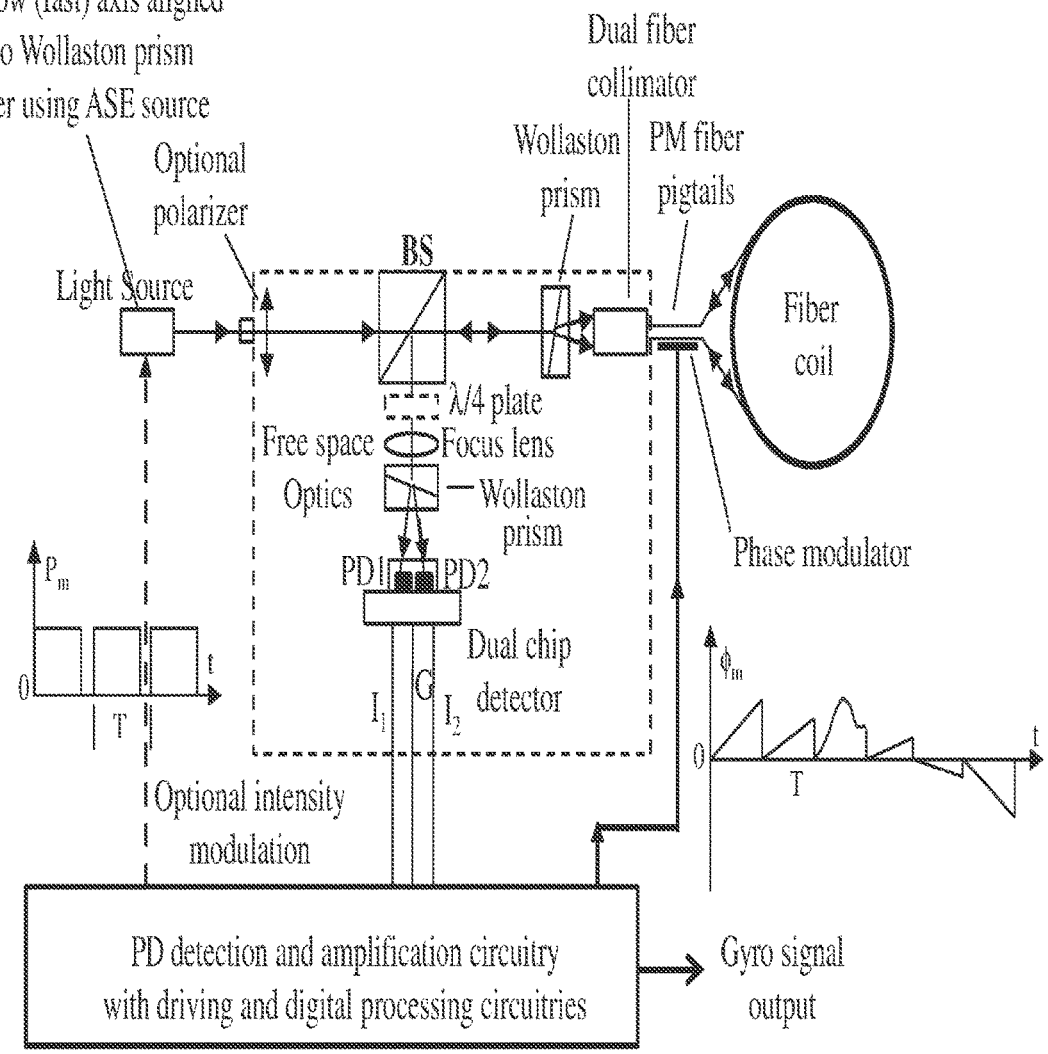
FIG. 24 shows a second example of a closed loop polarimetric fiber optic gyroscope (P-FOG) in which two detectors are used to replace the single PD in FIG. 23 for eliminating/reducing common mode noise in the optical path, such as the laser RIN noise or the interferometric noise from reflections or other component imperfections. The electronics include the PD detection and amplification, the driving circuits for modulating the phase modulator and the light source (optional), and the signal processing circuit for minimizing the detected signal to close the loop. The two PDs can be connected with the conventional configuration of FIG. 12A or the balanced configuration of FIG. 12B. Note that the dual chip PD can be replaced with a dual fiber collimator to couple light into two separate fibers. The outputs of the two fibers are then coupled into two separate PDs.
Figure 25:
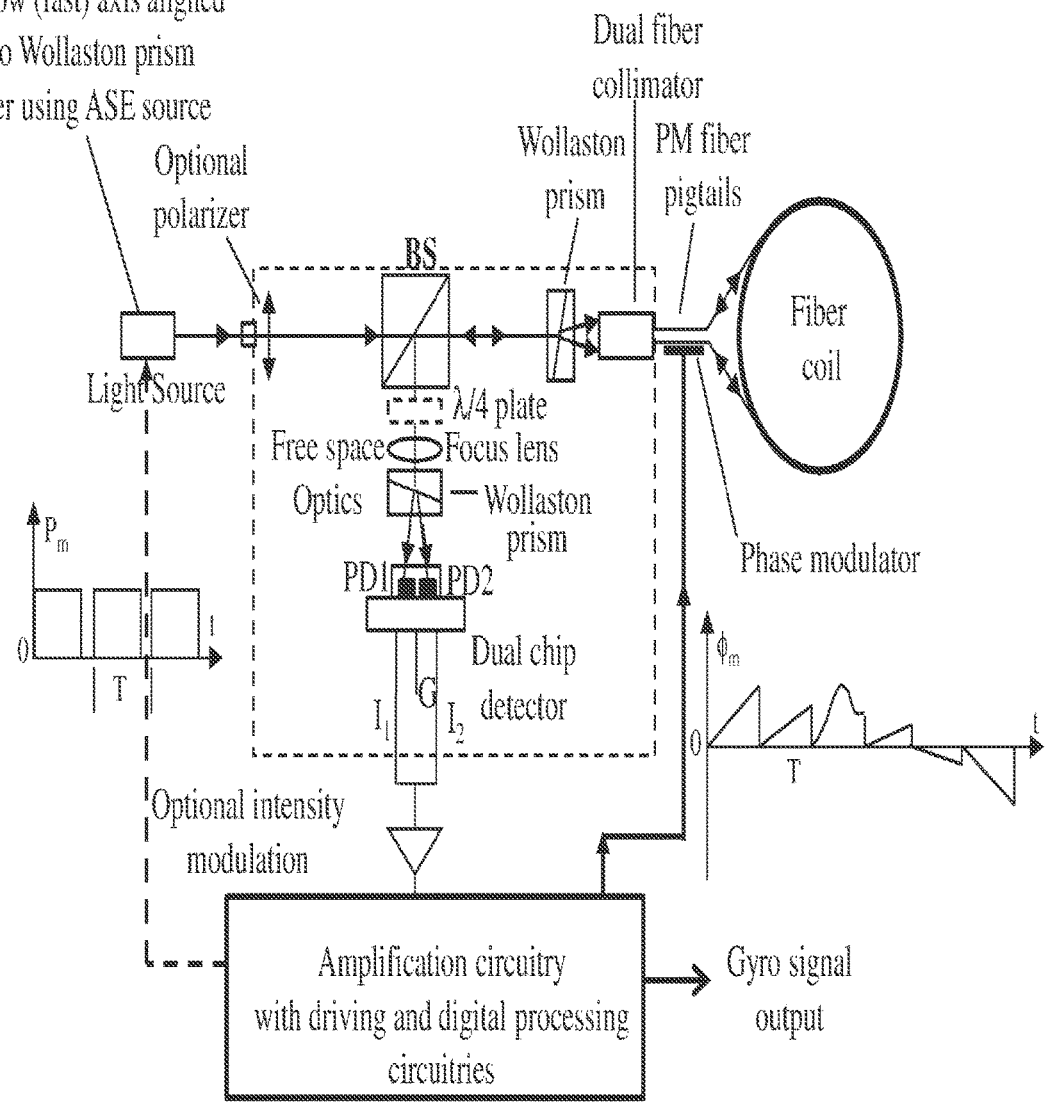
FIG. 25 shows a third example of a closed loop polarimetric fiber optic gyroscope (P-FOG) in which the two detectors are specifically connected with the balanced detection configuration as shown in FIG. 12B.

FIG. 24 shows another example of a closed loop polarimetric fiber optic gyroscope (P-FOG) in which two detectors are used to replace the single PD1 in FIG. 23 for eliminating/reducing common mode noise in the optical path, such as the laser RIN noise or the interferometric noise from reflections or other component imperfections, such as differential phase shift of the BS, as well as eliminate adverse effects by imperfections and temperature dependence of the wave plate. Except for the phase modulator for forming the closed loop, the other optical parts and their arrangement may be implemented in various ways such as in the configuration in FIG. 14A. For example, a quarter waveplate can be placed before the Wollaston prism to introduce a nominal phase difference of π/2 between the two orthogonal polarizations in the light before the Wollaston prism. The electronic and optical components for forming the closed loop include the PD detection and amplification, the driving circuits for modulating the phase modulator and the light source (optional), and the signal processing circuit for minimizing the detected signal to close the loop. The two PDs can be connected with the detection configuration of FIG. 12A or the balanced configuration of FIG. 12B, as shown in FIG. 25. In various implementations, the dual chip PD can be replaced with a dual fiber collimator to couple light into two separate fibers. The outputs of the two fibers are then coupled into two separate PDs.

Figure 26:
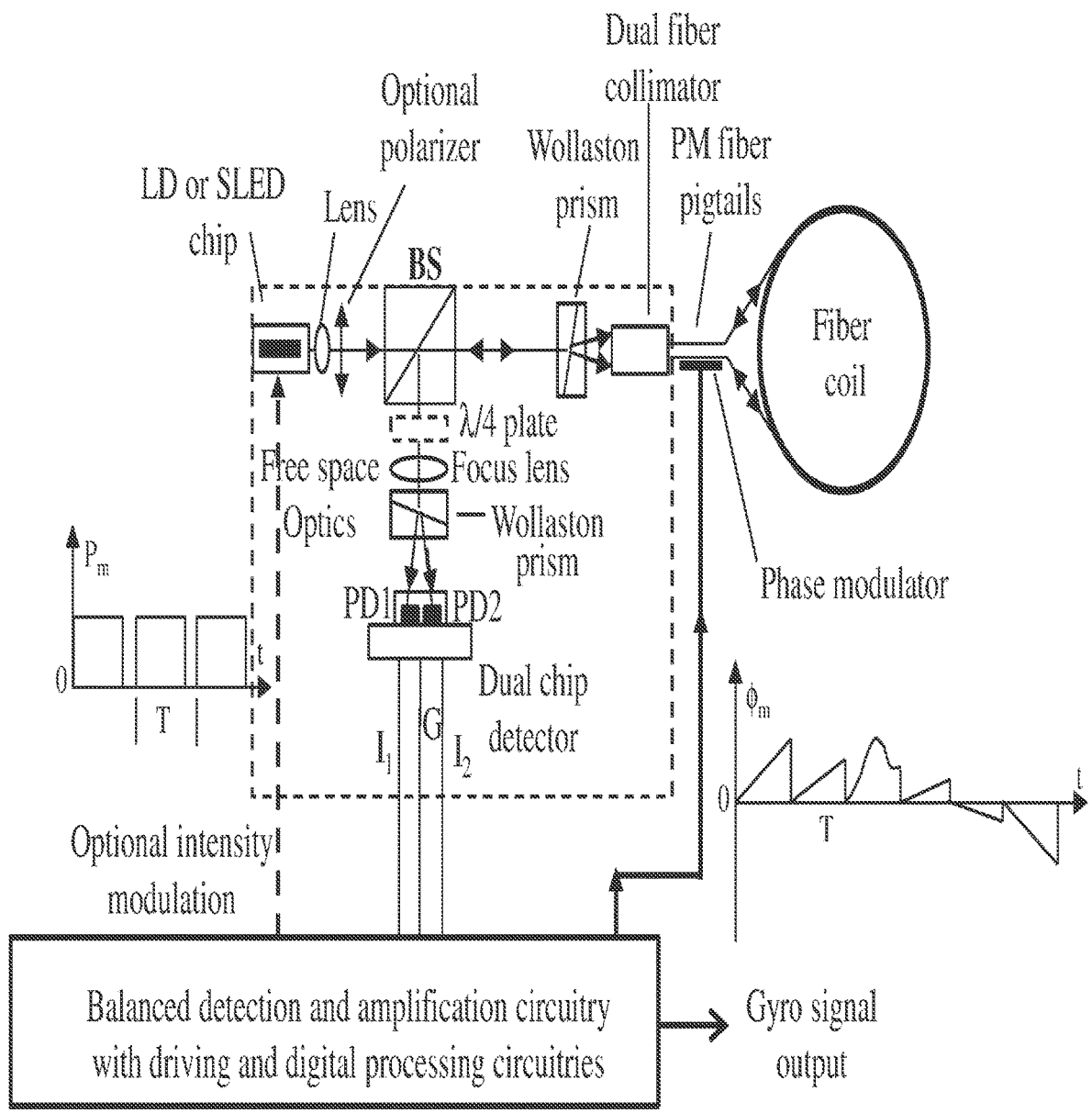
FIG. 26 shows a fourth example of a closed loop polarimetric fiber optic gyroscope (P-FOG) in which the pigtailed light source in FIG. 23, FIG. 24.

FIG. 26 shows another example of a closed loop polarimetric fiber optic gyroscope (P-FOG) in which the pigtailed light source in FIG. 23, FIG. 24, or FIG. 25 is replaced with a laser diode (LD) or superluminescent diode (SLED) chip so that all optical components, including light source, beamsplitter, lenses, Wollaston prisms, dual fiber collimator, and the photodetectors can be integrated into a small package while leaving only the fiber coil and the electronics outside of the package.

Figure 27:
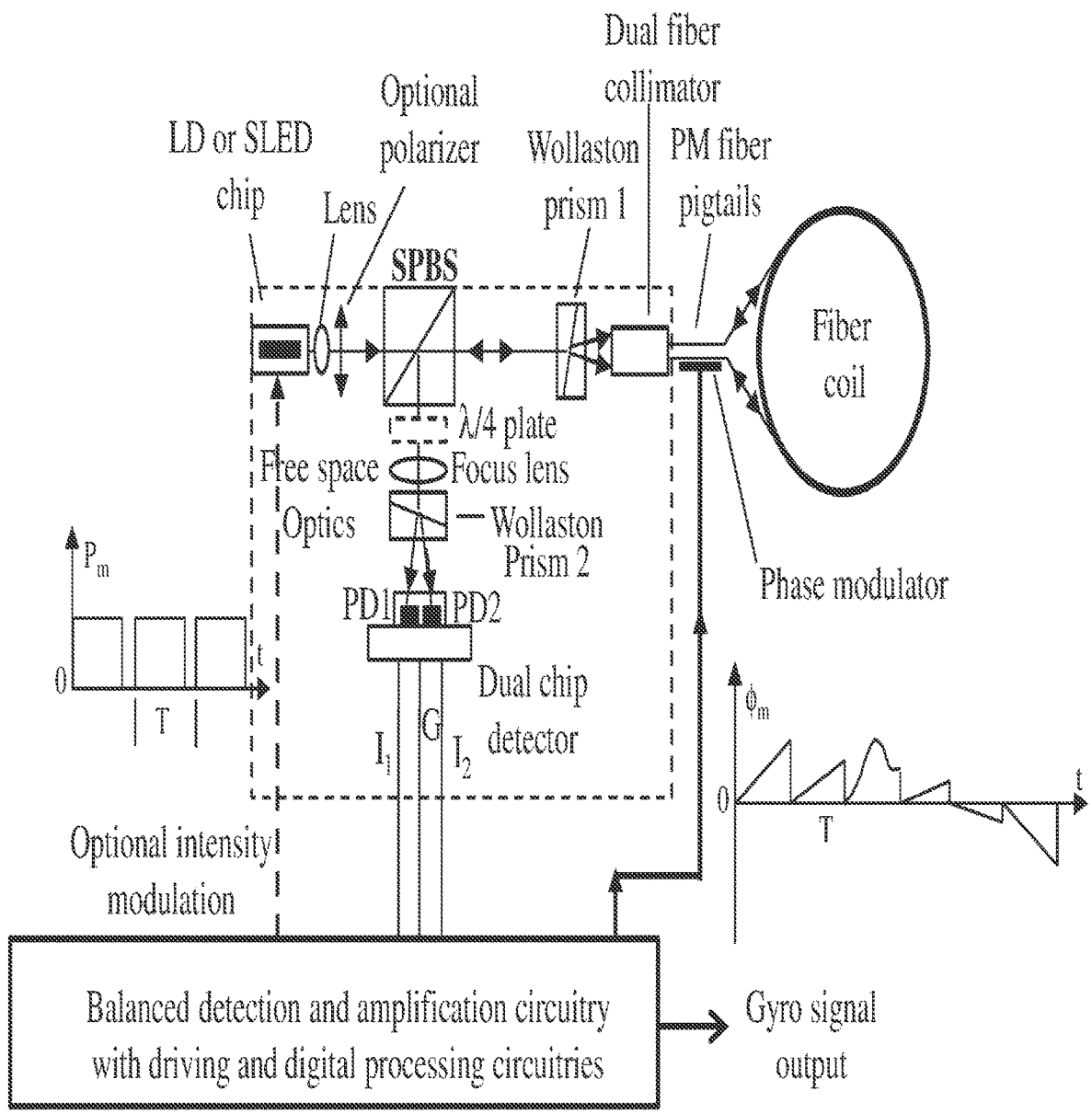
FIG. 27 shows a fifth example of a closed loop polarimetric fiber optic gyroscope (P-FOG) in the beam splitter (BS) is

FIG. 27 shows yet another example of a closed loop polarimetric fiber optic gyroscope (P-FOG) in which the beam splitter (BS) in FIGS. 23, 24, 25, and 26 are replaced with a special PBS (SPBS) shown in FIG. 22A. The Wollaston prism 3 in FIG. 22A is not necessary because of the close-loop operation. Note that the dual chip PD can be replaced with a dual fiber collimator to couple light into two separate fibers. The outputs of the two fibers are then coupled into two separate photodetectors PD 1 and PD2.

In all the configurations described above, the most expensive component may be the phase modulator. Unlike in a conventional FOG, a high speed phase modulator made with LiNbO3 or other type of electro-optic crystals is required, only slow phase modulation is needed for implementing the closed loop designs. In implementations of the conventional FOG, the high speed phase modulator is first driven with a square wave of sharp rising and falling edges at a frequency inversely proportional to the propagation time of light around the fiber coil. The needed bandwidth for such a high speed phase modulator is generally high, e.g., on the order of 1000 MHz or more in various designs. In contrast, the bandwidth requirement of the slow phase modulator for the closed loop designs in this document is much less, e.g., on the order of 100 times less. This reduced requirement on the phase modulation for the closed loop designs can open the door for the much less costly phase modulators and detectors for making a closed loop FOG, significantly reducing the total gyro cost.

In addition, the bandwidth of the photodetection electronics required for the FOG disclosed in this application is 100 times smaller, resulting in much less noise (10 times less in noise amplitude). Furthermore, the wide bandwidth light source used in the conventional closed loop FOG, such as ASE or SLED sources, can be replaced with a low cost laser source, such as a VCSEL or a low-cost diode laser used in compact disc drivers and other devices, further reduce the total component cost.

The following sections explain the closed loop operation in more detail. The modulation induced phase difference between the counter propagation waves in the fiber coil can be expressed as:

$$\Delta\phi_\mu = \phi(\tau) - \phi(\tau-\tau) = (1/2)(\delta\phi/\delta\tau)\tau = \alpha\tau \qquad (46)$$

where τ is the time difference between two counter propagation waves arriving at the phase modulator and $\alpha = (1/2)d\phi/dt$ is the linear slope of the saw wave phase modulation. The feedback loop is to cause the total phase difference between the two waves to be zero:

$$\phi_A + \Delta\phi_m = 0 \text{ or } \phi_r = -\Delta\phi_m \qquad (47)$$

At the zero differential phase, the rotation induced phase equals the modulation induced phase in amplitude, but with an opposite sign. As a result, the phase modulation slope α can be obtained:

$$\alpha = -\phi_r/\tau \qquad (48)$$

The rotation induced phase can be expressed as:

$$\phi_p = (2\pi\Delta/\lambda_0)\tau\Omega \qquad (49)$$

where D is the fiber coil diameter, $\lambda_0$ is the center wavelength of the light source, and Ω is the rotation rate of the gyro. The required modulation rate for cancelling out the rotation induced phase is:

$$\alpha = (2\pi D/\lambda_0)\Omega \qquad (50)$$

The maximum modulation rate $\alpha_{max}$ of the phase modulator is $$\alpha_{max}=(2\pi D/\lambda_0)\Omega_{max} \qquad (51)$$

where $\Omega_{max}$ is the maximum rotation rate to be detected. Therefore, the maximum modulation rate $\alpha_{max}$ is independent of the coil length, is only proportional to the coil diameter D and $\Omega_{max}$, and is inversely proportional to the optical wavelength of the light. As an example, for a D=5 cm, a wavelength of 1.5 um, the relation between the maximum modulation speed and the maximum rotation rate is:

$$\alpha_{max}=2*10^5*\Omega_{max} \qquad (52)$$

For $\Omega_{max}$=500 degrees/s=2.8π/s, the maximum modulation rate is 1.75 Mrad/s.

As examples, for a rotation rate of 0.1 and 0.01 degrees/hour, the required modulation rates for the closed loop operation are about 100 rad/s and 10 rad/s, respectively. Those are low modulation rate values that are easy to produce or handle in optical modulation engineering practice.

In some implementation of the closed loop gyroscope devices, a fiber stretcher type phase modulator formed by a fiber coil engaged to a fiber stretching device such as a PZT-actuated device can be used to implement the closed loop operation. For example, the phase shifter FPS-003 from General Photonics has $V_\pi$ of 3 volts, a bandwidth of 40 kHz, and total driving voltage of 150 volts. This corresponds to a maximum phase modulation slope of 2 Mrad/s, sufficient for the closed loop operation. More fiber can be wound on the PZT cylinder to further reduce the $V_\pi$, which effectively increase the modulation rate for the same applied voltage slope.

Another way to make low cost phase modulator is to coat the fiber with electro-optic polymers or PZT coating while applying an electrical control signal to cause the modulation of the fiber length. The frequency response for such a fiber phase modulator can be on the order of 10 MHz for certain designs of a PZT coated fiber modulator. Electro-restrictive or magneto-restrictive coatings can also be used to make such low cost phase modulators.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A method for sensing rotation based on sensing of optical polarization of light without relying on optical interferometry, comprising:

splitting an input optical beam with an input optical polarization into a first optical beam with a first optical polarization and a second optical beam with a second optical polarization that is orthogonal to the first optical polarization;

coupling the first and second optical beams into an input/output port of an optical loop, which is subject to a rotation, to direct the first optical beam to propagate in the optical loop in a first loop direction and the second optical beam to propagate in the optical loop in a second loop direction opposite to the first loop direction;

combining light of the first and second optical beams at the input/output port, while maintaining the first and second optical beams to be orthogonal to each other without causing optical interference between the first and second optical beams at the input/output port, to produce a combined optical beam as an optical output of the optical loop;

detecting the optical output to obtain information on optical polarization of the optical output, which is associated with a phase difference between counter propagating first and second optical beams in the optical loop;

providing a closed feedback loop control by using information from the optical output of the optical loop as a feedback to produce a feedback control signal;

operating a phase modulator as part of the closed feedback loop control to cause a phase modulation in a least one of the first and second optical beams in the optical loop to produce a modulation induced phase difference between the counter propagating first and second optical beams, wherein the phase modulation is at a phase modulation frequency range that includes a low phase modulation frequency range less than a fraction of a frequency inversely proportional to a propagation time for light to travel around the optical loop;

applying the feedback control signal to the phase modulator to cause the modulation induced phase difference to balance out a phase difference between the counter propagating first and second optical beams induced by the rotation of the optical loop so that a net phase difference between the counter propagating first and second optical beams in the optical loop is zero or near zero;

controlling the feedback control signal to cause the optical output of the optical loop to contain at least one Stokes parameter which is proportional to a sine function of a phase difference between the counter propagating first and second optical beams in the optical loop; and processing the phase modulation signal applied to the phase modulator to obtain information of the rotation experienced by the optical loop.

2. The method as in claim 1, comprising:

using a saw wave signal as the phase modulation signal; and using a slope of the saw wave signal to obtain the information of the rotation experienced by the optical loop.

3. The method as in claim 1, further comprising:

modulating the input optical beam at an input light modulation frequency; and in detecting the optical output of the optical lo selectively extracting information carried by the optical output at the input light modulation frequency while filtering out DC signal components.

4. The method as in claim 3, comprising:
setting the input light modulation frequency in modulating the input optical beam to have periodicity close to a periodicity of the phase modulation of the phase modulator as part of the closed feedback loop control.

5. The method as in claim 1, wherein:
the phase modulator includes a fiber stretcher modulator.

6. The method as in claim 1, comprising:
using a laser to produce the input optical beam with power fluctuations;
splitting the optical output into two different optical output beams with different optical polarizations;
using two photodetectors to detect, respectively, the two different optical output beams to produce two photodetector outputs; and
processing the two photodetector outputs to produce a differential signal for obtaining the information on optical polarization of the optical output.

7. The method as in claim 6, comprising:
introducing a nominal phase difference of $\pi/2$ between the two orthogonal polarizations in the optical output before splitting the optical output into two different optical output beams with different optical polarizations.

8. The method as in claim 6, wherein:
the laser includes a vertical-cavity surface-emitting laser (VCSEL), a diode laser, or a light source emitting light of amplified spontaneous emission.

9. The method as in claim 6, comprising:
operating a Wollaston prism to split the optical output from the optical loop into a first optical output beam and a second optical output beam which are in two different optical polarizations; directing the first and second optical output beams into the two photodetectors, respectively, to produce the two photodetector outputs; and
processing the two photodetector outputs to produce a processed signal proportional to the differential phase between the two counter propagating optical beams in the optical loop.

10. The method as in claim 6, comprising:
placing the two photodetectors into a same package to form a dual chip detector.

11. The method as in claim 1, comprising:
operating a Wollaston prism to split the input optical beam into the first optical beam with the first optical polarization and the second optical beam with the second optical polarization that is orthogonal to the first optical polarization; and
coupling a dual fiber collimator to receive the first and second optical beams from the Wollaston prism into the input/output port of the optical loop and to produce the combined optical beam as the optical output of the optical loop.

12. An optical gyroscope for sensing rotation based on sensing of optical polarization of light without relying on optical interferometry, comprising:
an optical input/output device that splits an input optical beam with an input optical polarization into a first optical beam with a first optical polarization and a second optical beam with a second optical polarization that is orthogonal to the first optical polarization;
an optical loop coupled to the optical input/output device and having a first loop end to receive the first optical beam to propagate in the optical loop in a first loop direction and a second loop end to receive the second optical beam to propagate in the optical loop in a second loop direction opposite to the first loop direction,
wherein the optical input/output device is configured to combine light of the first and second optical beams from the optical loop while maintaining the first and second optical beams to be orthogonal to each other without causing optical interference between the first and second optical beams at the optical input/output device, to produce a combined optical beam as an optical output of the optical loop;
a detection device that detects the optical output to obtain information on optical polarization of the optical output, which is associated with a phase difference between the counter propagating first and second optical beams in the optical loop, and processes the obtained information on optical polarization of the optical output to determine the rotation experienced by the optical loop;
a phase modulator coupled to the optical loop to cause a phase modulation in a least one of the first and second optical beams into the optical loop to produce a modulation induced phase difference between the counter propagating first and second optical beams, wherein the phase modulator is structured so that the phase modulation is at a phase modulation frequency range that includes a low phase modulation frequency range less than a fraction of a frequency inversely proportional to a propagation time for light to travel around the optical loop; and
a closed feedback loop control coupled to the detection device and operable to produce a feedback control signal based on the optical output of the optical loop as a feedback to the phase modulator to cause the modulation induced phase difference to balance out a phase difference between the counter propagating first and second optical beams induced by the rotation of the optical loop so that a net phase difference between the counter propagating first and second optical beams in the optical loop is zero or near zero, wherein the closed feedback loop control is structured to operate to cause the optical output of the optical loop to contain at least one Stokes parameter which is proportional to a sine function of a phase difference between the counter propagating first and second optical beams in the optical loop.

13. The optical gyroscope as in claim 12, wherein the optical input/output device includes:
a Wollaston prism to split the input optical beam into the first optical beam with the first optical polarization and the second optical beam with the second optical polarization that is orthogonal to the first optical polarization; and
a dual fiber collimator coupled to receive the first and second optical beams from the Wollaston prism into the input/output port of the optical loop and to produce the combined optical beam as the optical output of the optical loop.

14. The optical gyroscope as in claim 12, comprising:
a laser to produce the input optical beam with power fluctuations;
a polarization device located to receive and split the optical output into two different optical output beams with different optical polarizations;

two photodetectors included as part of the detection device and positioned to detect, respectively, the two different optical output beams to produce two photodetector outputs; and a balanced detector circuit included as part of the detection device and coupled to the two photodetectors and operable to subtract the two photodetector outputs to produce a differential signal for obtaining the information on optical polarization of the optical output.

15. The optical gyroscope as in claim 14, further comprising:
a quarter wave plate placed before the polarization device to introduce a nominal phase difference of $\pi/2$ between the two orthogonal polarizations in the optical output.

16. The optical gyroscope as in claim 14, wherein:
the two photodetectors are packaged into a same package to form a dual chip detector.

17. The optical gyroscope as in claim 14, wherein:
the laser includes a vertical-cavity surface-emitting laser (VCSEL), a diode laser, or a light source emitting light of amplified spontaneous emission.

18. The optical gyroscope as in claim 14, comprising:
a Wollaston prism positioned to receive and to split the optical output from the optical loop into a first optical output beam and a second optical output beam which are in two different optical polarizations,
wherein the two photodetectors are positioned relative to the Wollaston prism to receive the first and second optical output beams, respectively, to produce the two photodetector outputs.

19. The optical gyroscope as in claim 18, further comprising:
a quarter wave plate placed before the Wollaston prism to introduce a nominal phase difference of $\pi/2$ between the two orthogonal polarizations in the optical output.

20. The optical gyroscope as in claim 12, comprising:
a circuit that modulates the input optical beam at an input light modulation frequency; and
a detection circuitry coupled to selectively extract information carried by the optical output at the input light modulation frequency while filtering out DC or lower frequency signal components.

21. The optical gyroscope as in claim 20, wherein:
the input light modulation frequency in modulating the input optical beam is set to have a periodicity close to a periodicity of the phase modulation of the phase modulator as part of the closed feedback loop control.

22. The optical gyroscope as in claim 12, wherein:
the phase modulator includes a fiber stretcher modulator based on a PZT actuator.

23. The optical gyroscope as in claim 12, wherein:
the phase modulator includes a fiber segment that is coated with an electro-optic polymer which is responsive to an electrical control signal to cause the modulation of the fiber length.

24. The optical gyroscope as in claim 12, wherein:
the phase modulator includes a fiber segment that is coated with an electro-restrictive or magneto-restrictive coating which is responsive to a control signal to cause the modulation of the fiber length.

25. The optical gyroscope as in claim 12, wherein the optical input/output device includes:
an optical beam splitter to transmit light in an input polarization as the input optical beam;
a Wollaston prism oriented to align a polarization axis of the Wollaston prism at 45 degrees with respect to the input polarization of the optical beam splitter and positioned to receive the input optical beam from the optical beam splitter to split the input optical beam into the first optical beam with the first optical polarization and the second optical beam; and
a dual fiber collimator coupled to receive and direct the first and second optical beams from the Wollaston prism into the input/output port of the optical loop, the dual fiber collimator further directing the first and second optical beams from the optical loop to the Wollaston prism which combines the first and second optical beams into the combined optical beam as the optical output to the optical beam splitter,
wherein the detection device is positioned to receive an optical reflection from the optical beam splitter as the optical output.

26. The optical gyroscope as in claim 25, wherein the optical input/output device includes a quarter wave plate between the optical beam splitter and the detection device.

* * * * *

UNITED STATES PATENT AND TRADEMARK OFFICE
CERTIFICATE OF CORRECTION

PATENT NO. : 11,293,757 B2
APPLICATION NO. : 16/383413
DATED : April 5, 2022
INVENTOR(S) : Xiaotian Steve Yao It is certified that error appears in the above-identified patent and that said Letters Patent is hereby corrected as shown below:

In the Claims

In Column 26, Line 64, Claim 3: delete "lo" and insert -- loop --, therefor.

Signed and Sealed this
Fifth Day of July, 2022

Katherine Kelly Vidal
*Director of the United States Patent and Trademark Office*